US012596166B2

(12) United States Patent (10) Patent No.: US 12,596,166 B2
Hirzallah et al. (45) Date of Patent: Apr. 7, 2026

(54) CONFIGURATION OF POSITIONING MODELS UTILIZING MULTIPLE TRANSMISSION RECEPTION POINTS

(71) Applicant: QUALCOMM Incorporated, San Diego, CA (US)

(72) Inventors: Mohammed Ali Mohammed Hirzallah, San Diego, CA (US); Srinivas Yerramalli, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 18/187,522

(22) Filed: Mar. 21, 2023

(65) Prior Publication Data

US 2024/0319308 A1 Sep. 26, 2024

(51) Int. Cl.
*G01S 5/00* (2006.01)
*G01S 5/02* (2010.01)

(52) U.S. Cl.
CPC .......... *G01S 5/0027* (2013.01); *G01S 5/0236* (2013.01); *G01S 5/02524* (2020.05)

(58) Field of Classification Search
CPC ... G01S 5/0027; G01S 5/02524; G01S 5/0236
(Continued)

(56) References Cited

U.S. PATENT DOCUMENTS 10,942,247 B2 * 3/2021 Sackenreuter ........... G01S 5/14
12,126,478 B2 * 10/2024 Sosnin .................. H04L 5/0032
(Continued)

FOREIGN PATENT DOCUMENTS

JP 2023538808 A * 9/2023 .......... G01S 5/0063
WO 2022221805 A1 10/2022
(Continued)

OTHER PUBLICATIONS

3GPP TS 37.355: "3rd Generation Partnership Project, Technical Specification Group Radio Access Network, LTE Positioning Protocol (LPP) (Release 17)", 3GPP Standard, Technical Specification, 3rd Generation Partnership Project, Mobile Competence Centre, 650, Route Des Lucioles, F-06921 Sophia-Antipolis Cedex, France, No. V17.3.0, (Dec. 2022), Jan. 13, 2023, XP052235207,pp. 1-348, p. 55-p. 56.

(Continued)

*Primary Examiner* — Harry K Liu
(74) *Attorney, Agent, or Firm* — Procopio, Cory, Hargreaves & Savitch LLP

(57) ABSTRACT

A user equipment (UE) may receive a set of reference signals (RSs) from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another and may be received during a same time period. The UE may measure the set of RSs from each of the plurality of network nodes received during the same time period. The UE may transmit, for a network entity, positioning information associated with measuring the set of RSs from each of the plurality of network nodes.

30 Claims, 15 Drawing Sheets

(58) Field of Classification Search
USPC ......................................................... 342/451
See application file for complete search history.

(56) References Cited

U.S. PATENT DOCUMENTS

| | | | |
|---|---|---|---|
| 2014/0148198 A1 | 5/2014 | Siomina et al. | |
| 2024/0295625 A1* | 9/2024 | Hasegawa ............. | G01S 5/0263 |

FOREIGN PATENT DOCUMENTS

| WO | WO-2023151555 A1 * | 8/2023 | ............ H04W 64/00 |
|---|---|---|---|
| WO | WO-2024163544 A1 * | 8/2024 | ........... G01S 5/0236 |
| WO | WO-2024173459 A1 * | 8/2024 | .......... H04W 64/006 |

OTHER PUBLICATIONS

Gaal P (Qualcomm Incorporated)., et al., "Other Aspects on AI-ML for Positioning Accuracy Enhancement", 3GPP Draft, 3GPP TSG RAN WG1 #112, R1-2301409, Type Discussion, FS_NR_AIML_ AIR, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, XP052248541, 31 pages, Whole Clauses 3 & 4.
International Search Report and Written Opinion—PCT/US2024/ 019586—ISA/EPO—Jul. 5, 2024.

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

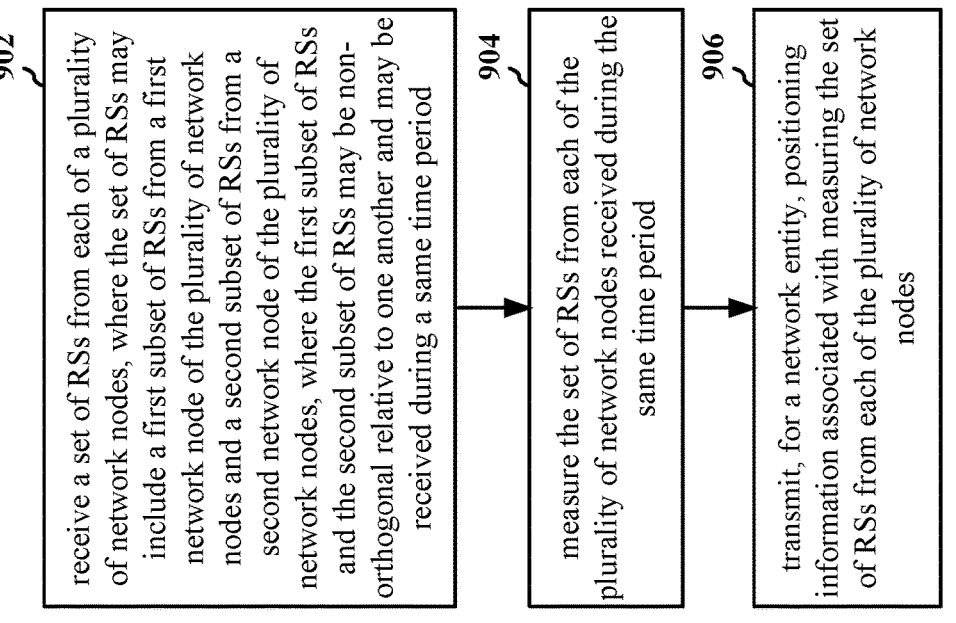

902
receive a set of RSs from each of a plurality of network nodes, where the set of RSs may include a first subset of RSs from a first network node of the plurality of network nodes and a second subset of RSs from a second network node of the plurality of network nodes, where the first subset of RSs and the second subset of RSs may be non-orthogonal relative to one another and may be received during a same time period 904
measure the set of RSs from each of the plurality of network nodes received during the same time period 906
transmit, for a network entity, positioning information associated with measuring the set of RSs from each of the plurality of network nodes

Figure 10:
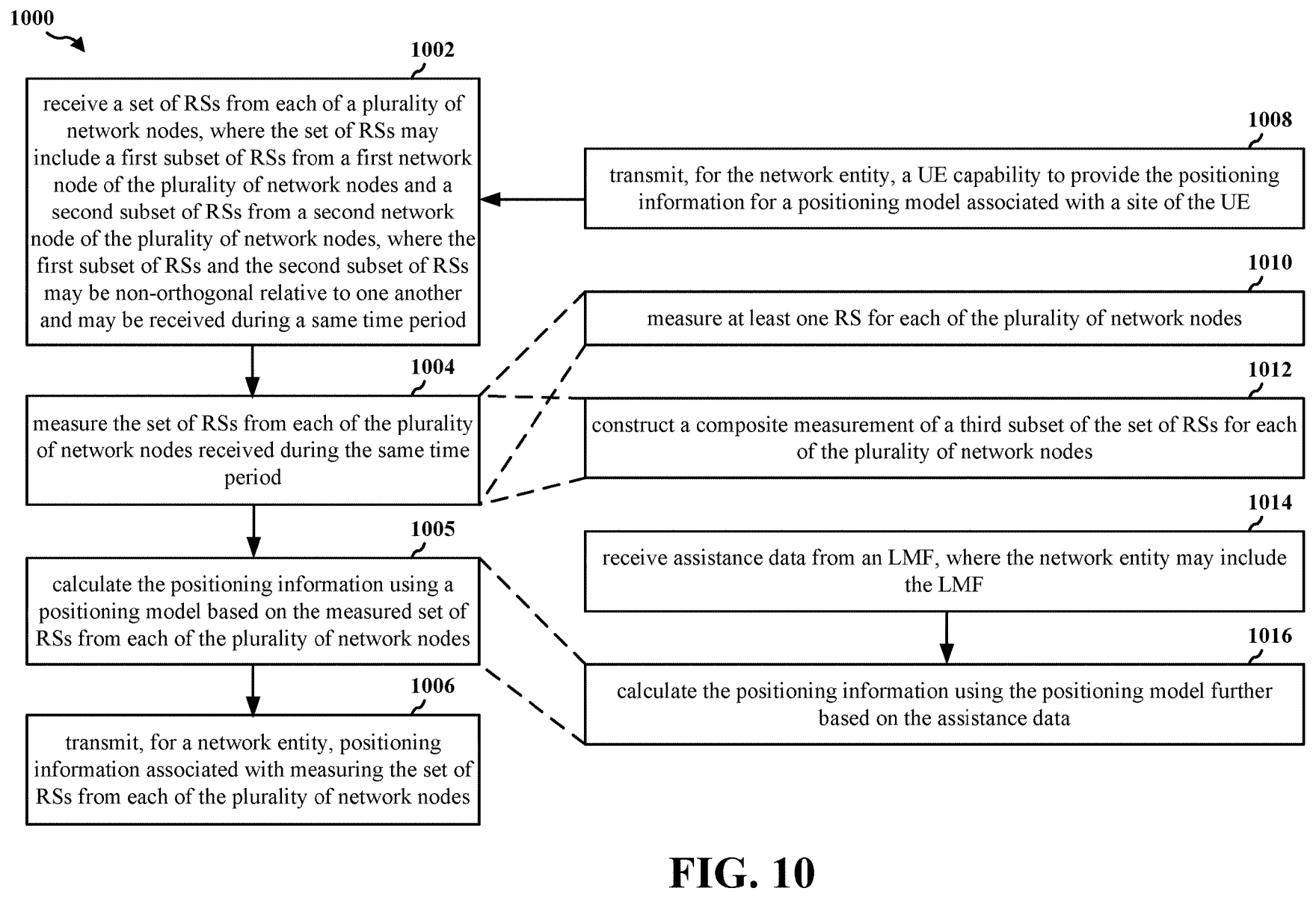

1002 — receive a set of RSs from each of a plurality of network nodes, where the set of RSs may include a first subset of RSs from a first network node of the plurality of network nodes and a second subset of RSs from a second network node of the plurality of network nodes, where the first subset of RSs and the second subset of RSs may be non-orthogonal relative to one another and may be received during a same time period 1004 — measure the set of RSs from each of the plurality of network nodes received during the same time period 1005 — calculate the positioning information using a positioning model based on the measured set of RSs from each of the plurality of network nodes 1006 — transmit, for a network entity, positioning information associated with measuring the set of RSs from each of the plurality of network nodes 1008 — transmit, for the network entity, a UE capability to provide the positioning information for a positioning model associated with a site of the UE 1010 — measure at least one RS for each of the plurality of network nodes 1012 — construct a composite measurement of a third subset of the set of RSs for each of the plurality of network nodes 1014 — receive assistance data from an LMF, where the network entity may include the LMF 1016 — calculate the positioning information using the positioning model further based on the assistance data

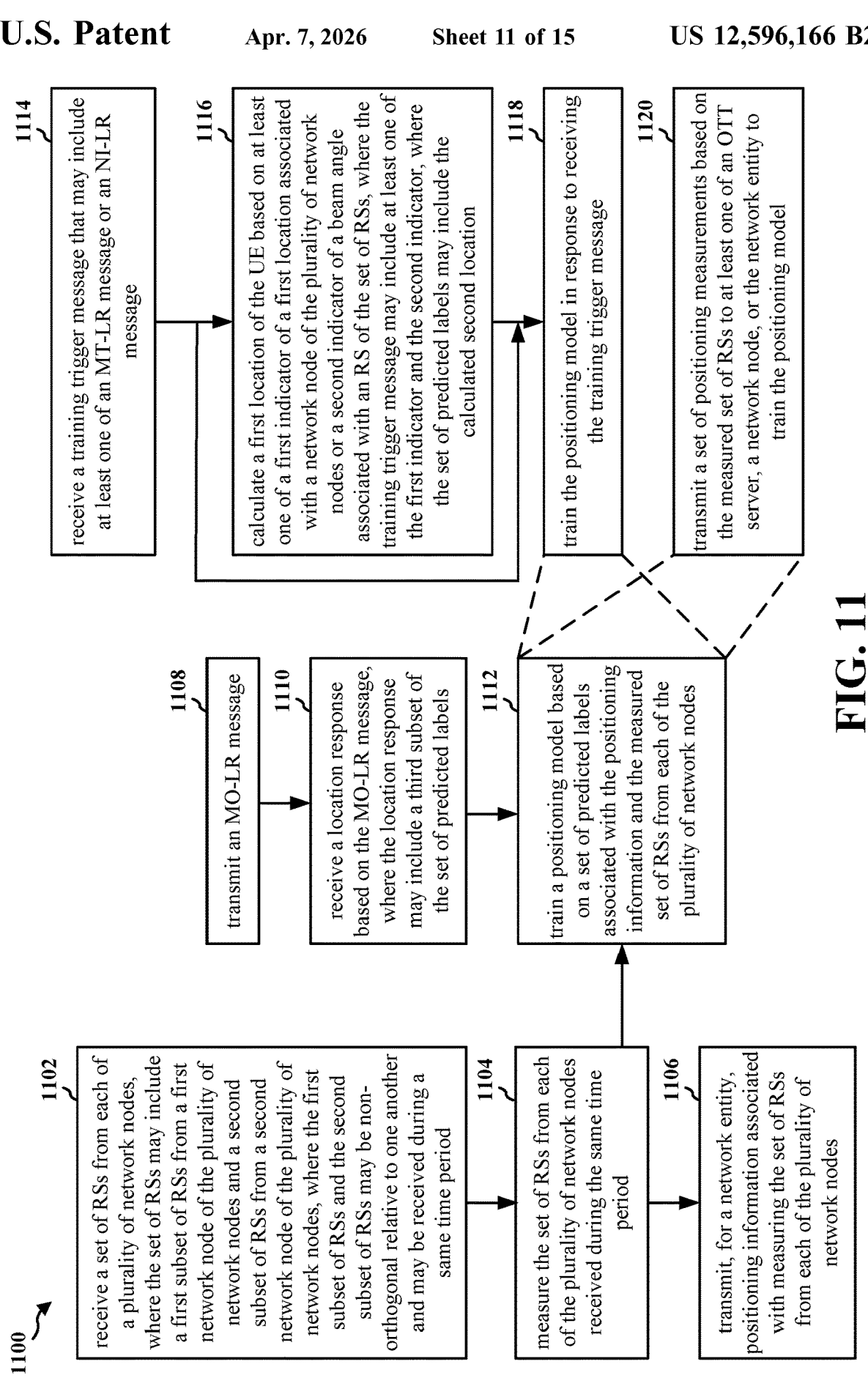

1102 receive a set of RSs from each of a plurality of network nodes, where the set of RSs may include a first subset of RSs from a first network node of the plurality of network nodes and a second subset of RSs from a second network node of the plurality of network nodes, where the first subset of RSs and the second subset of RSs may be non-orthogonal relative to one another and may be received during a same time period 1104 measure the set of RSs from each of the plurality of network nodes received during the same time period 1106 transmit, for a network entity, positioning information associated with measuring the set of RSs from each of the plurality of network nodes 1108 transmit an MO-LR message 1110 receive a location response based on the MO-LR message, where the location response may include a third subset of the set of predicted labels 1112 train a positioning model based on a set of predicted labels associated with the positioning information and the measured set of RSs from each of the plurality of network nodes 1114 receive a training trigger message that may include at least one of an MT-LR message or an NI-LR message 1116 calculate a first location of the UE based on at least one of a first indicator of a first location associated with a network node of the plurality of network nodes or a second indicator of a beam angle associated with an RS of the set of RSs, where the training trigger message may include at least one of the first indicator and the second indicator, where the set of predicted labels may include the calculated second location 1118 train the positioning model in response to receiving the training trigger message 1120 transmit a set of positioning measurements based on the measured set of RSs to at least one of an OTT server, a network node, or the network entity to train the positioning model

1202 configure a plurality of network nodes to transmit a set of RSs at a UE

1204 transmit assistance data for a positioning model at the UE

1206 receive positioning information associated with a measurement of the set of RSs by the UE

1200

CONFIGURATION OF POSITIONING MODELS UTILIZING MULTIPLE TRANSMISSION RECEPTION POINTS

TECHNICAL FIELD

The present disclosure relates generally to communication systems, and more particularly, to a positioning system utilizing positioning models to assist in interpreting reference signals (RSs) from multiple transmission reception points (TRPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new conditions associated with latency, reliability, security, scalability (e.g., with Internet of Things (IoT)), and other conditions. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. It may be beneficial to have further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive a set of reference signals (RSs) from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another. The first subset of RSs and the second subset of RSs may be received during a same time period. The apparatus may measure the set of RSs from each of the plurality of network nodes received during the same time period. The apparatus may transmit, for a network entity, positioning information associated with measuring the set of RSs from each of the plurality of network nodes.

In an aspect of the disclosure, a method, a computer-readable medium, and an apparatus are provided. The apparatus may include a network entity. The network entity may include a location management function (LMF). The apparatus may configure a plurality of network nodes to transmit a set of RSs at a UE. The apparatus may transmit assistance data for a positioning model at the UE. The apparatus may receive positioning information associated with a measurement of the set of RSs by the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication.

FIG. 10 is a flowchart of a method of wireless communication.

FIG. 11 is a flowchart of a method of wireless communication.

DETAILED DESCRIPTION

Figure 1:
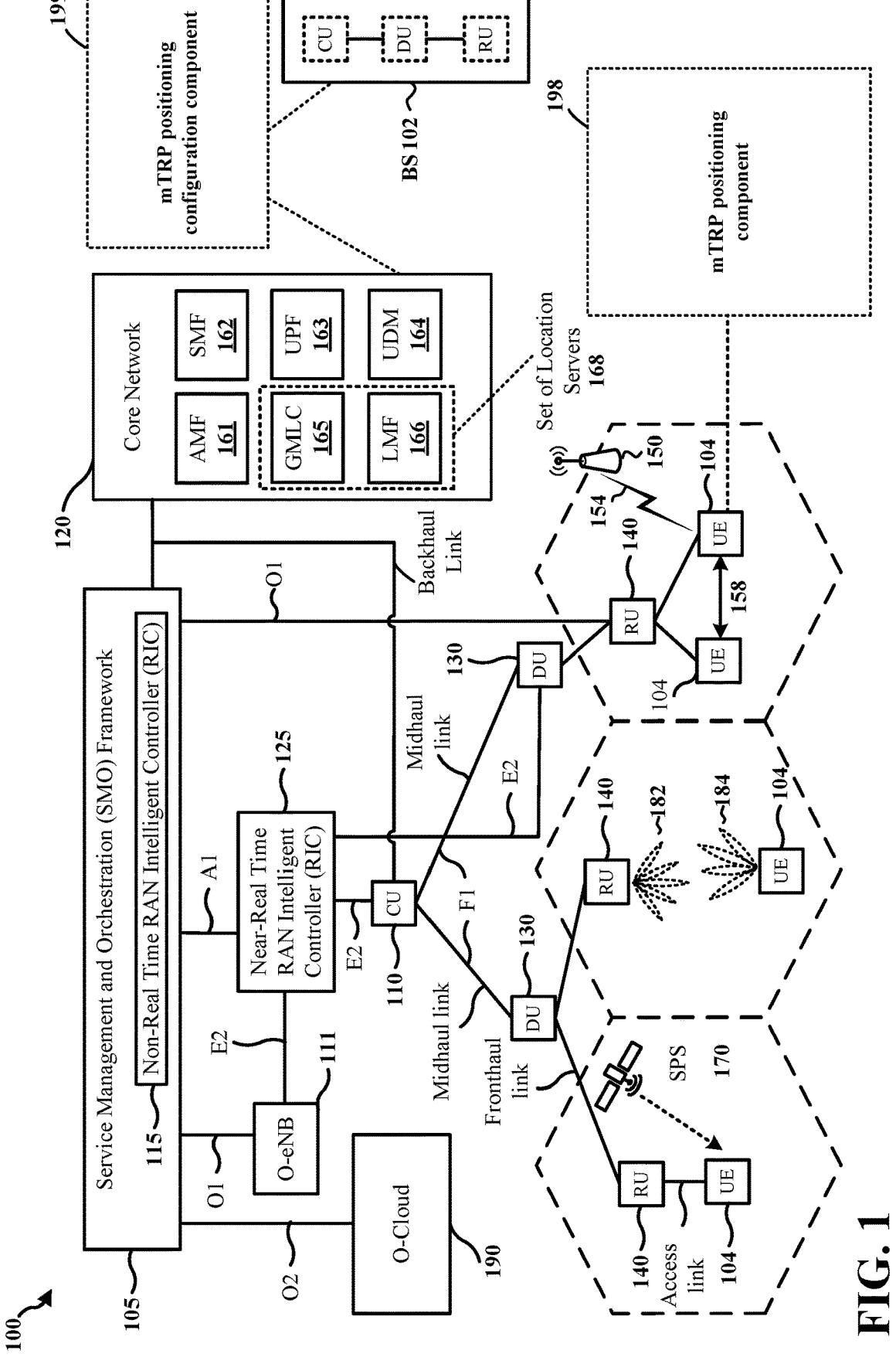
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 902.11 standards, the IEEE 902.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication, and more particularly to utilizing positioning models to interpret wireless signals. Some aspects more specifically relate to utilizing positioning models to interpret reference signals (RSS) from multiple transmission reception points (TRPs). The positioning models may be trained using artificial intelligence machine learning (AIML or AI/ML), and may also be referred to as AIML positioning models or AIML models. In some examples, a wireless device, such as a user equipment (UE), may be configured to perform positioning with a plurality of TRPs of a network. For example, each of a plurality of TRPs may transmit a set of RSs to the UE. The UE may measure the set of RSs from the plurality of TRPs to perform positioning. The wireless device may train a positioning model, such as an artificial intelligence machine learning (AIML) positioning model, to improve its accuracy in performing positioning. For example, the wireless device may train a positioning model with measurements of the set of RSs and expected results, such as a position of the wireless device, or intermediate measurements (e.g., time of arrival (ToA), reference signal time difference (RSTD), angle of departure (AoD) or line-of-sight (LOS) identification) that may be used to calculate the position of the wireless device. Such expected results used for training a positioning model may be referred to as expected labels, or labels, used for training the positioning model. Over time, the positioning model may be able to reliably estimate or calculate a set of positioning information based on measuring a set of RSs from a plurality of TRPs.

In order to leverage such a wireless device, the wireless device may be configured to signal its capability of performing positioning utilizing a positioning model to a network entity that configures positioning, such as a location management function (LMF) or a location server in a core network. The network entity may configure the UE and the plurality of TRPs to perform positioning to optimize use of the positioning model.

In some aspects, a UE may be configured to receive a set of RSs from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another and may be received during a same time period. The first subset of RSs and the second subset of RSs may be orthogonal relative to one another and may be received during a same time period. The UE may measure the set of RSs from each of the plurality of network nodes received during the same time period. The UE may train a positioning model based on a set of predicted labels associated with positioning information and the measured set of RSs from each of the plurality of network nodes. The UE may calculate positioning information using a positioning model based on the measured set of RSs from each of the plurality of network nodes. The UE may transmit, for a network entity, the positioning information associated with measuring the set of RSs from each of the plurality of network nodes. In some aspects, a network entity may configure a plurality of network nodes to transmit a set of RSs at a UE. The network entity may transmit assistance data for a positioning model at the UE. The network entity may receive positioning information associated with a measurement of the set of RSs by the UE.

In one aspect, one or more positioning reference signal (PRS) configurations of one or more TRPs may be provided to a positioning model associated with a UE. Based on the one or more PRS configurations, the positioning model may output intermediate positioning information for the one or more TRPs. Intermediate positioning information may include positioning measurement information that may be used to calculate the location of a UE, for example ToA, RSTD, AoD, or LOS identification information. In one aspect, the positioning model may be trained based on a mapping between the one or more PRS configurations and intermediate positioning information, such as timing, angle, LOS identification information, etc. In one aspect, the one or more TRPs may transmit positioning signals that are orthogonal or non-orthogonal. Positioning information associated with measuring the orthogonal or non-orthogonal positioning signals may be calculated using the positioning model. In one aspect, a UE may indicate its capability to provide AIML assisted positioning (i.e., positioning utilizing a positioning model) based on multi-TRPs RS measurements. In one aspect, a location server may provide assistance data to the positioning model associated with the UE. The assistance data may include reference TRP information, PRS configuration information, PRS orthogonality information, location mapping information (e.g., mapping between PRS identifiers (IDs) and TRP IDs), and/or reporting configuration information. In one aspect, the UE may measure signals sent from TRPs, conduct inferences (e.g., using a positioning model), and report intermediate positioning information back to the location server. In one aspect, the UE may report an indication of TRPs that the UE used to estimate a timing measurement. In one aspect, a wireless device (e.g., a UE, a network node) may collect training data for the positioning model during one or more positioning sessions and reported to a training entity. In one aspect, a network node or a network entity may derive training labels based on at least one of TRP locations, beam angles, NW sync error, timing error, etc. and may be provided to the UE as part of a location response. In one aspect, the UE may derive training labels using the UE's estimated location based on network-provided TRP location information and/or beam angle information. In one aspect, an over-the-top (OTT) server (e.g., owned by the UE chip vendor, the UE vendor), a network entity part of a 5G core, or a location server (e.g., a location management function) may train the positioning model using the collected information. Once the positioning model is trained, the positioning model may be transferred and deployed to a UE for use in calculating positioning information. In one aspect, a training entity may train the positioning model online (e.g., as a cloud entity that receives transmissions from the UE and/or network node performing the positioning). The training entity may receive intermediate positioning information estimates from the UE and may compare the estimates with expected values (i.e., labels) to train the positioning model.

Particular aspects of the subject matter described in this disclosure can be implemented to realize one or more of the following potential advantages. In some examples, by transmitting positioning information based on measuring subsets of RSs from a plurality of TRPs, the described techniques can be used to train positioning models for inferring positioning information using subsets of RSs from a plurality of TRPs. The subsets of RSs may be transmitted simultaneously and may or may not be orthogonal, but the positioning model may accurately infer the positioning information as a result of such training. Configuring such signaling infrastructure, capability exchange, resource configuration, assistance data/information, and positioning information may enable positioning model training for intermediate positioning information learning based on joint measurements collected from a plurality of TRPs. This may enhance the accuracy of calculated intermediate positioning information based on the trained positioning models. The positioning model may learn mapping between multiple measurements obtained from multiple PRS resources and intermediate positioning information for one or more TRPs. The positioning model may learn site-specific features that help achieve accurate estimate of such intermediate positioning information, such as ToA, RSTD, AoD, or LOS identification positioning information.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, may be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage conditions that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher frequency operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, a set of location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The set of location servers 168 are illustrated as including a Gateway Mobile Location Center (GMLC) 165 and a Location Management Function (LMF) 166. However, generally, the set of location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance data/information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and, in some aspects, a velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a multi-transmission reception point (mTRP) positioning component 198 that may be configured to receive a set of reference signals (RSs) from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another. The first subset of RSs and the second subset of RSs may be received during a same time period. The mTRP positioning component 198 may be configured to measure the set of RSs from each of the plurality of network nodes received during the same time period. The mTRP positioning component 198 may be configured to transmit, for a network entity, positioning information associated with measuring the set of RSs from each of the plurality of network nodes. In certain aspects, the base station 102, LMF 166, or at least one of the set of location servers 168 may have an mTRP positioning configuration component 199 that may be configured to configure a plurality of network nodes to transmit a set of RSs at a UE. The mTRP positioning configuration component 199 may be configured to transmit assistance data for a positioning model at the UE. The mTRP positioning configuration component 199 may be configured to receive positioning information associated with a measurement of the set of RSs by the UE. The mTRP positioning configuration component 199 may configure positioning by the mTRP positioning component 198 to train a positioning model, and/or use a positioning model to assist in positioning with RSs received from a plurality of TRPs during a same time period. The mTRP positioning component 198 may train the positioning model to learn the mapping between multiple measurements obtained from multiple positioning reference signals (PRSs) and positioning information, such as a location of the UE or an intermediate measurement, such as an angle or a LOS identification associated with an RS. The mTRP positioning component 198 may train the positioning model to learn site specific features that help the positioning model to estimate or calculate positioning information with a high degree of accuracy. The mTRP positioning configuration component 199 may configure positioning using such a positioning model based on signaling between the mTRP positioning configuration component 199 and the mTRP positioning component 198.

Figures 2A, 2B, 2C, 2D:
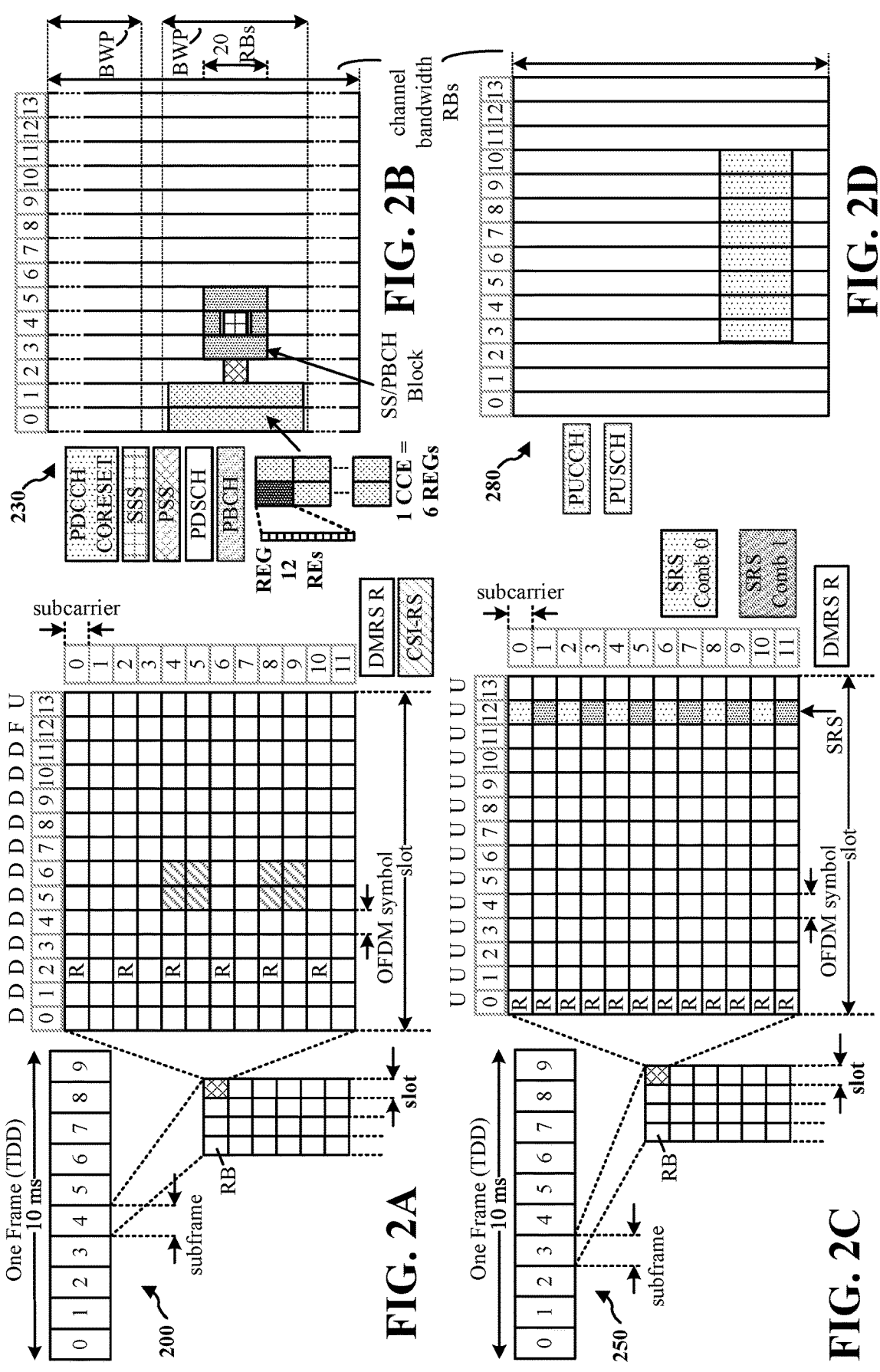
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
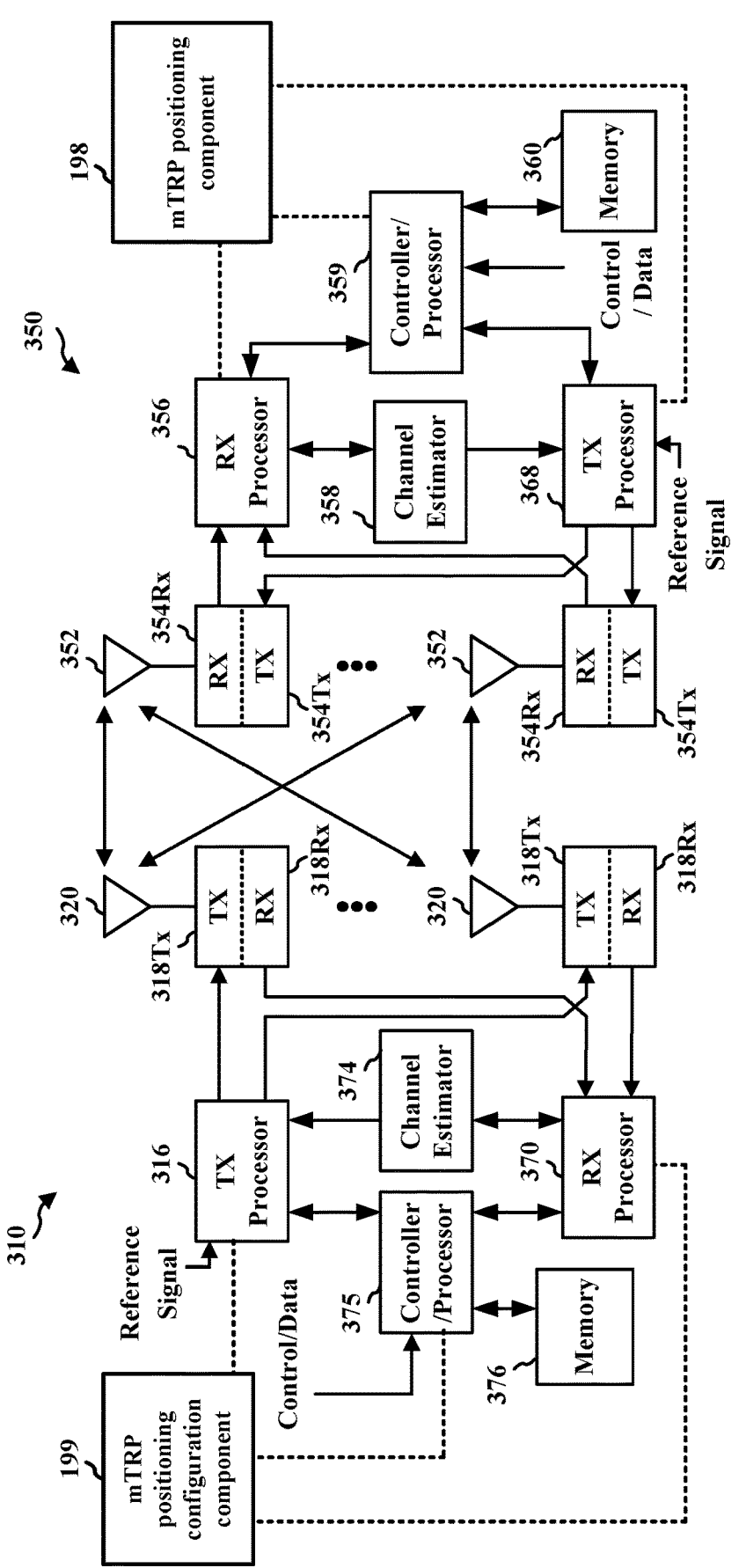
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the mTRP positioning component 198 of FIG. 1.

At least one of the TX processor 316, the RX processor 370, and the controller/processor 375 may be configured to perform aspects in connection with the mTRP positioning configuration component 199 of FIG. 1.

Figure 4:
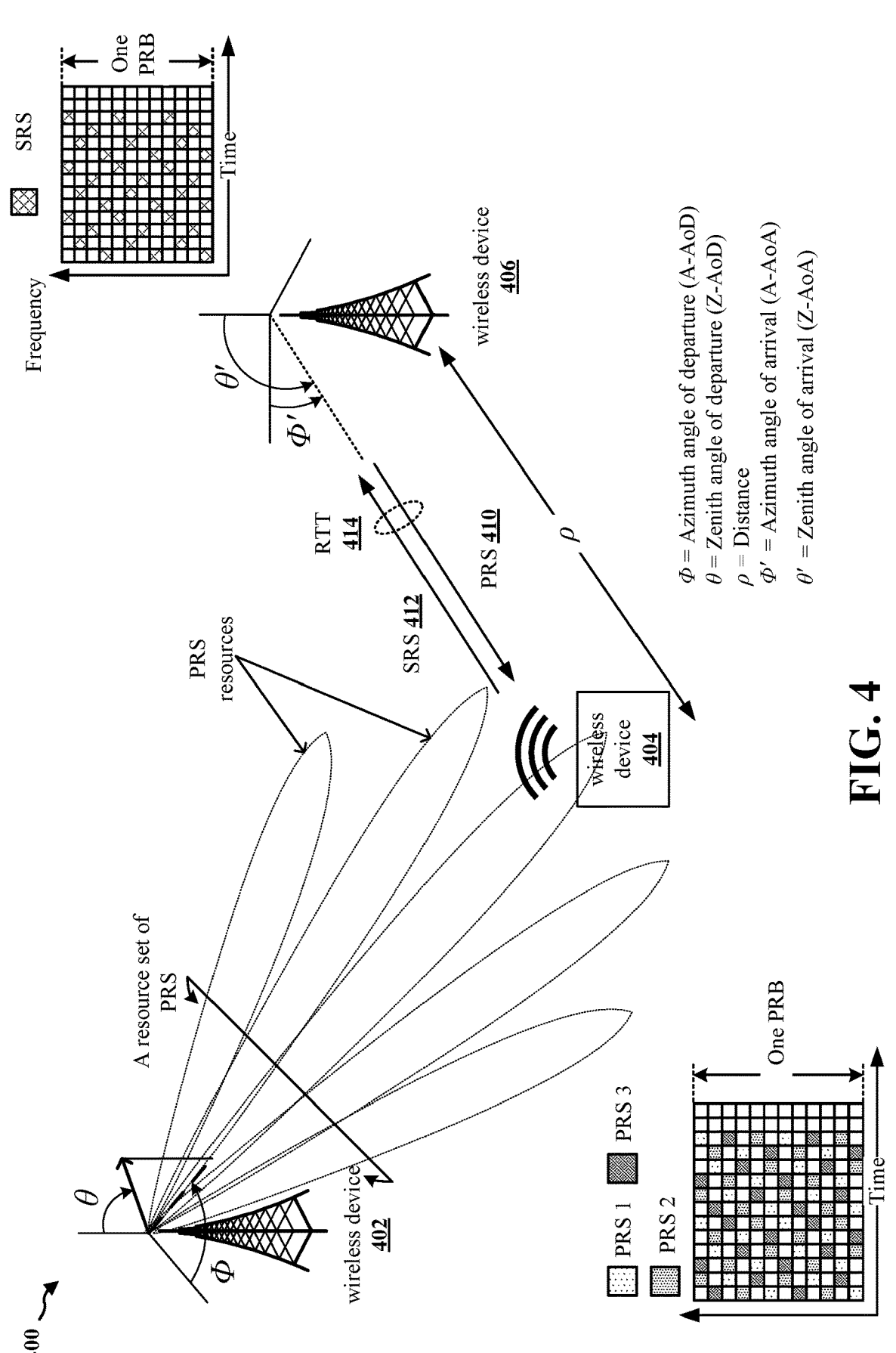
FIG. 4 is a diagram illustrating an example of positioning based on reference signal measurements.

FIG. 4 is a diagram 400 illustrating an example of positioning based on reference signal measurements, such as PRSs, SRSs, or CSI-RSs. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS\_TX}$ to the wireless device 406. The wireless device 404 may receive positioning reference signals (PRS) 410 at time $T_{PRS\_RX}$ from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., one of the set of location servers 168), the wireless device 404, or the wireless device 406 may determine the round-trip-time (RTT) 414 based on $||T_{SRS\_RX}-T_{PRS\_TX}|-|T_{SRS\_TX}-T_{PRS\_RX}||$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

When performing positioning, a wireless device may use a positioning model, for example one trained using AIML, to estimate or calculate positioning information associated with measuring a set of positioning signals. A positioning model may be trained based on a set of inputs and a set of labels, which may also be referred to as predicted labels. The labels may be expected outputs for the positioning model. For example, to train a positioning model to calculate positioning information associated with measuring a set of positioning signals, a system may train the positioning model using a set of inputs, such as measurements of the set of positioning signals and assistance data associated with performing the positioning (e.g., positioning signal configuration information, identifiers of wireless devices transmitting positioning signals, correlations between wireless devices and signal resources) and a set of predicted labels. After the positioning model has been trained using AIML over time using sets of inputs and sets of predicted labels of positioning information, a wireless device may use the positioning model to reliably calculate positioning information based on new inputs.

The positioning information may include, for example (a) a ToA for the positioning signal to reach a wireless device, (b) an RSTD (i.e., difference between two ToAs from two different TRPs), (c) an AoD of a positioning signal, and/or (d) an indication of an LOS identification (i.e., presence or absence of a direct LOS path between two wireless devices performing positioning). The positioning model may use one or more inputs to calculate the positioning information. The inputs may include, for example, a measurement of a positioning signal transmitted by a TRP, such as a PRS or a CSI-RS. The measurement may be, for example, (a) a channel impulse response (CIR) measurement, (b) a relative time of arrival (RTOA) measurement, (c) an UL angle-of-arrival (UL-AoA) measurement, (d) a DL angle-of-departure (DL-AoD) measurement, (e) a receive (Rx) transmit (Tx) (Rx-Tx) time difference measurement, (f) a reference signal time difference (RSTD) measurement, (g) a reference signal received power (RSRP) measurement, (h) a line-of-sight (LOS) identification measurement, and/or (i) a non-line-of-sight (NLOS) identification measurement. When a wireless device receives a set of positioning signals transmitted by multiple TRPs, such as the wireless device 404 that receives PRS signals from the wireless device 402 and the wireless device 406 in FIG. 4, the wireless device may input measurements of the set of positioning signals to a positioning model to calculate positioning information associated with the multiple TRPs that transmitted the positioning signals.

Figures 5A, 5B, 5C, 5D:
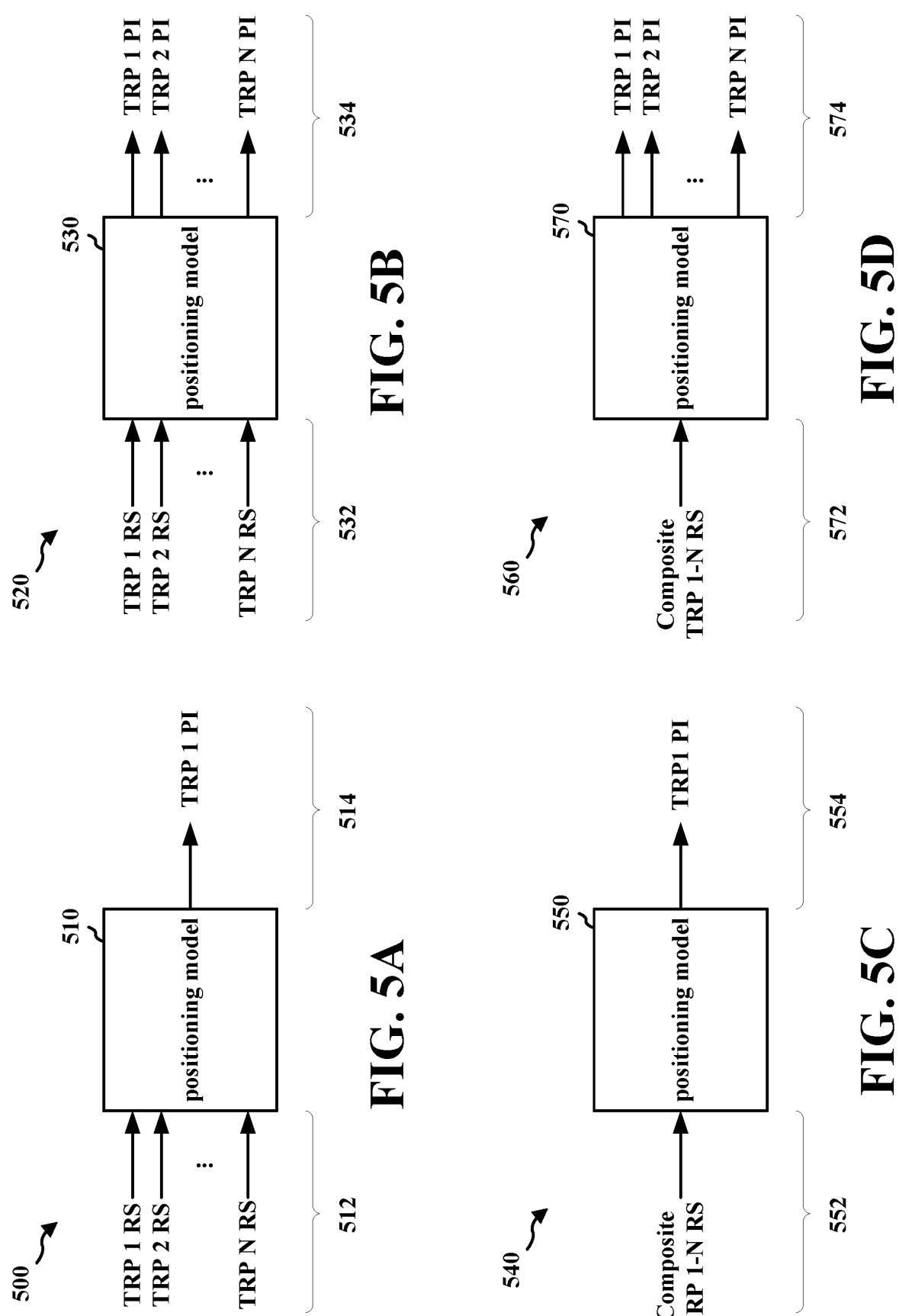
FIG. 5A is a diagram illustrating a positioning model configured to calculate a set of positioning information associated with a transmission reception point (TRP) based on a set of positioning signal measurements from a plurality of TRPs.
FIG. 5B is a diagram illustrating a positioning model configured to calculate a set of positioning information associated with a plurality of TRPs based on a set of positioning signal measurements from the plurality of TRPs.
FIG. 5C is a diagram illustrating a positioning model configured to calculate a set of positioning information associated with a TRP based on a composite measurement of a set of positioning signals from a plurality of TRPs.
FIG. 5D is a diagram illustrating a positioning model configured to calculate a set of positioning information associated with a plurality of TRPs based on a composite measurement of a set of positioning signals from the plurality of TRPs.

FIG. 5A is a diagram 500 illustrating a positioning model 510 configured to calculate a set of outputs 514 based on a set of inputs 512. The positioning model 510 may be trained to calculate the set of outputs 514 based on a set of predicted labels from a first set of sources (e.g., an LMF, a network node transmitting positioning signals, a set of sensors at a wireless device, location information of wireless devices participating in a positioning session) and the set of inputs 512 from a second set of sources, which may be the same or different than the first set of sources (e.g., the same LMF and the same network node transmitting positioning signals, or just the same network node transmitting positioning signals). The positioning model 510 may be configured to calculate positioning information (PI) associated with a single network node (shown in FIG. 5A as TRP 1) based, at least in part, on measurements of a set of positioning signals transmitted from a plurality of network nodes (shown in FIG. 5A as RSs from TRP 1, TRP 2, . . . . TRP N). For example, the positioning model 510 may be configured to calculate an RSTD between a positioning signal transmitted from TRP 1 and positioning signals transmitted from each of the other TRPs from TRP 2 to TRP N, and may be configured to calculate an AoD of the positioning signal transmitted from TRP 1 based on measurements of each of the positioning signals transmitted from TRP 1 to TRP N.

FIG. 5B is a diagram 520 illustrating a positioning model 530 configured to calculate a set of outputs 534 based on a set of inputs 532. The positioning model 530 may be trained to calculate the set of outputs 534 based on a set of predicted labels from a first set of sources and the set of inputs 532 from a second set of sources, which may be the same or different than the first set of sources. The positioning model 530 may be configured to calculate positioning information associated with a plurality of network nodes (shown in FIG. 5B as positioning information associated with TRPs 1–N) based, at least in part, on measurements of a set of positioning signals transmitted from a plurality of network nodes (shown in FIG. 5B as RSs from TRP 1–N). For example, the positioning model 530 may be configured to calculate whether there exists a LOS between a UE and a plurality of TRPs from 1 to N based on measurements of each of the positioning signals transmitted from TRP 1 to TRP N.

FIG. 5C is a diagram 540 illustrating a positioning model 550 configured to calculate a set of outputs 554 based on a set of inputs 552. The positioning model 550 may be trained to calculate the set of outputs 554 based on a set of predicted labels from a first set of sources and the set of inputs 552 from a second set of sources, which may be the same or different than the first set of sources. The positioning model 550 may be configured to calculate positioning information associated with a single network node (shown in FIG. 5C as TRP 1) based, at least in part, on a composite of measurements of a set of positioning signals transmitted from a plurality of network nodes (shown in FIG. 5C as a composite of measurements of RSs from TRP 1–N). In some aspects, a composite may be a joint measurement of a plurality of RSs from a plurality of TRPs transmitted to a wireless device during a same time period. In other aspects, a composite may be an average of a plurality of measurements of RSs from a plurality of TRPs. For example, the positioning model 550 may be configured to calculate an RSTD between a positioning signal transmitted from TRP 1 and positioning signals transmitted from each of the other TRPs from TRP 2 to TRP N based on a set of composite measurements (i.e., one or more composite measurements) of each of the positioning signals transmitted from TRP 1 to TRP N.

FIG. 5D is a diagram 560 illustrating a positioning model 570 configured to calculate a set of outputs 574 based on a set of inputs 572. The positioning model 570 may be trained to calculate the set of outputs 574 based on a set of predicted labels from a first set of sources and the set of inputs 572 from a second set of sources, which may be the same or different than the first set of sources. The positioning model 570 may be configured to calculate positioning information associated with a plurality of network nodes (shown in FIG. 5D as positioning information associated with TRPs 1–N) based, at least in part, on a composite of measurements of a set of positioning signals transmitted from a plurality of network nodes (shown in FIG. 5C as a composite of measurements of RSs from TRP 1–N). For example, the positioning model 530 may be configured to calculate an RSTD and an AoD for each positioning signal transmitted from a plurality of TRPs from 1 to N based on a set of composite measurements of each of the positioning signals transmitted from TRP 1 to TRP N.

In some aspects, a network entity, such as the LMF 166 or the set of location servers 168 in FIG. 1, may configure positioning signals (e.g., PRS) transmitted from a plurality of TRPs (i.e., multi-TRP) as signals that are orthogonal with one another to avoid interference. In some aspects, a network entity may configure positioning signals transmitted from a plurality of TRPs as signals that are non-orthogonal to one another. For example, a plurality of TRPs may be configured to transmit a common sequence simultaneously over a common PRS resource. The wireless entity receiving the positioning signals may construct a composite measurement and use that composite measurement to estimate positioning information using a positioning model trained with such composite measurements. Such configurations may save on resources, as the signals may not be configured orthogonally to one another, and a common configuration may be used for a plurality of TRPs.

In some aspects, a wireless device, such as the UE 104 in FIG. 1, may indicate its capability to provide positioning information based on measurements of positioning signals from a plurality of TRPs using a positioning model, such as an AI/ML positioning model. The wireless device may transmit a capability message that indicates its capability. The capability message may include timing gap conditions/requirements between the positioning signals. For example, the wireless device may indicate a minimum gap between each received positioning signal for the wireless device to process the positioning signals. In some aspects, the wireless device may have a timing gap condition between different orthogonal reference signals in order to process the reference signals. The capability message may include a maximum number of TRPs that the wireless device expects to be configured. The maximum number of TRPs may correspond with a maximum number of TRPs that the positioning model has been trained with. The capability message may include a bandwidth (BW) capability of the wireless device, such as a BW range associated with positioning signals that the positioning model has been trained with. The capability message may include an indication of whether the wireless device may measure orthogonal resources, non-orthogonal resources, or both orthogonal and non-orthogonal resources. The indication may include which resources the positioning model has been trained with. The capability message may include quantities that are associated with the positioning information that the wireless device may calculate. For example, the capability message may indicate a number of ToAs, a number of RSTDs, and/or a number of LOSs that the wireless device may calculate using the positioning model. The capability message may include types of positioning information that the wireless device may calculate. For example, the capability message may indicate that the wireless device may calculate a ToA, an RSTD, an AoD, and/or a LOS identification based on the positioning signal measurements. The capability message may include zone/site information for which the positioning model may work. For example, the capability message may indicate a range of latitudes, a range of longitudes, and a range of heights that are associated with at least one positioning model that the wireless device uses to calculate positioning information.

In some aspects, a network entity may provide assistance data to the wireless device to help the positioning model calculate the positioning information. In other words, the wireless device may use the assistance data as inputs to the positioning model. The assistance data may include reference TRP information. The reference TRP information may include a set of reference TRP identifiers (IDs) associated with the TRPs that transmit the positioning signals. The assistance data may include a configuration of positioning signals (e.g., PRS signals, CSI-RS signals, SSBs) for the positioning signals that are transmitted to the wireless device. The assistance data may include an indicator of orthogonality associated with the positioning signals. For example, the indicator may indicate, for each set of positioning signals transmitted to the wireless device, whether the set of positioning signals are orthogonal or non-orthogonal to one another. The assistance data may include a mapping of TRPs to positioning signal resources. For example, the mapping may map PRS/cell IDs to TRP IDs, or may map PRS/cell IDs to locations on a map (e.g., latitude, longitude, elevation/height). The assistance data may include reporting configurations. A reporting configuration may indicate how the wireless device should report its measurements (e.g., periodic reports, reports transmitted in response to an event trigger, a number of measurements per report).

The wireless device may utilize the assistance data in one or more ways to assist in calculating positioning information. In one aspect, the wireless device may select a positioning model to use based on the assistance data. For example, one positioning model may be associated with a first set of positioning signal resources while another positioning model may be associated with a second set of positioning signal resources. In one aspect, the wireless device may be a positioning model in response to the assistance data indicating that the positioning signals are non-orthogonal resources, and may not use a positioning model in response to the assistance data indicating that the positioning signals are orthogonal. The assistance data may indicate how the wireless device is to measure the reference signals, as the configuration for the positioning signals may indicate a schedule of which positioning signals are transmitted from specified TRPs (e.g., a first PRS transmitted from TRP 3 followed by a second PRS transmitted from TRP 1). In some aspects, the wireless device may measure a subset of the received positioning signals. In other words, the number of TRPs indicated in the assistance data that are transmitting the positioning signals may be larger than the number of TRPs that the wireless device measures positioning signals from. The assistance data may indicate to the wireless device the TRP IDs that correspond with the TRPs that transmitted the set of positioning signals. The wireless device may indicate in its positioning information TRP IDs associated with the subset of positioning signals that the wireless device measured.

In some aspects, a plurality of TRPs may transmit positioning signals to a wireless device, and the wireless device may calculate positioning information based on measurements of the positioning signals, and, in some aspects, assistance data from a network entity, and may report the positioning information to the network entity. The report may include meta data. For example, the report may include an indication of TRPs that the wireless device used to estimate a timing measurement. The wireless device may use a subset of configured resources to calculate the positioning information, and may indicate in the report which subset of configured resources were used to calculate the positioning information.

In order to train a positioning model, a system may collect the training data while conducting positioning sessions with a set of wireless devices. For example, the system may collect the training data in response to a mobile originated location request (MO-LR) message, in response to a mobile terminated location request (MT-LR) message, and/or in response to a network induced location request (NI-LR) message. The wireless device may collect measurements of a set of positioning signals transmitted from a plurality of TRPs and report the measurements to a training entity. The training entity may be any suitable device, for example the wireless device that receives and measures the positioning signals, a network node that transmits the positioning signals, an LMF that configures the positioning signals, or some other compute device that receives the training data to train a positioning model. The training entity may be a 3GPP device or may not be a 3GPP device (but may receive training information from a 3GPP device). In some aspects, the labels for training the positioning model may be derived by a network node or a network entity, and may be provided to a training entity or may be transmitted to the wireless device that receives the positioning signals as part of a location response. The location response may indicate positioning signal resources and TRPs used. A network entity may use one or more of locations of TRPs that transmit the positioning signals, beam angles, network synchronization error values, and/or network timing error values to calculate timing labels after estimating a location of a wireless device. The network entity may time-stamp the information provided, which enables the wireless device to correlate multi-TRP measurements with the label feedback from the network. In some aspects, the labels for training the positioning model may be derived at the wireless device that receives the positioning signals. A network entity may transmit TRP location and/or beam angle information to the wireless device, and the wireless device may calculate labels using an estimated location of the wireless device. The wireless device may calculate its location based on positioning, for example measured positioning signals. The wireless device may calculate its location based on one or more sensors at the wireless device, such as LIDAR sensors, GPS sensors (e.g., via a GNSS fix), or WLAN sensors (e.g., by performing positioning based on known locations of other WLAN devices).

The training entity may be an over-the-top (OTT) server (e.g., owned by a UE chip vendor or a UE vendor), a network entity that is part of a core network, or a location server. In some aspects, the training entity may collect training data and conduct training of the positioning model offline. The training entity may transfer and deploy a trained positioning model to a wireless device, such as a UE or a PRU, for calculating positioning information. In some aspects, the training entity may collect training data and conduct training of the positioning model online. The training entity may receive intermediate positioning estimates directly from the wireless device that receives the positioning signals, and may compare the estimates with a set of expected values or labels. The training entity may compute estimation errors for a plurality of instances, may compute a gradient, and may feed back its computed gradient to the wireless device, which may then tune positioning model parameters based on the computed gradient.

Figure 6:
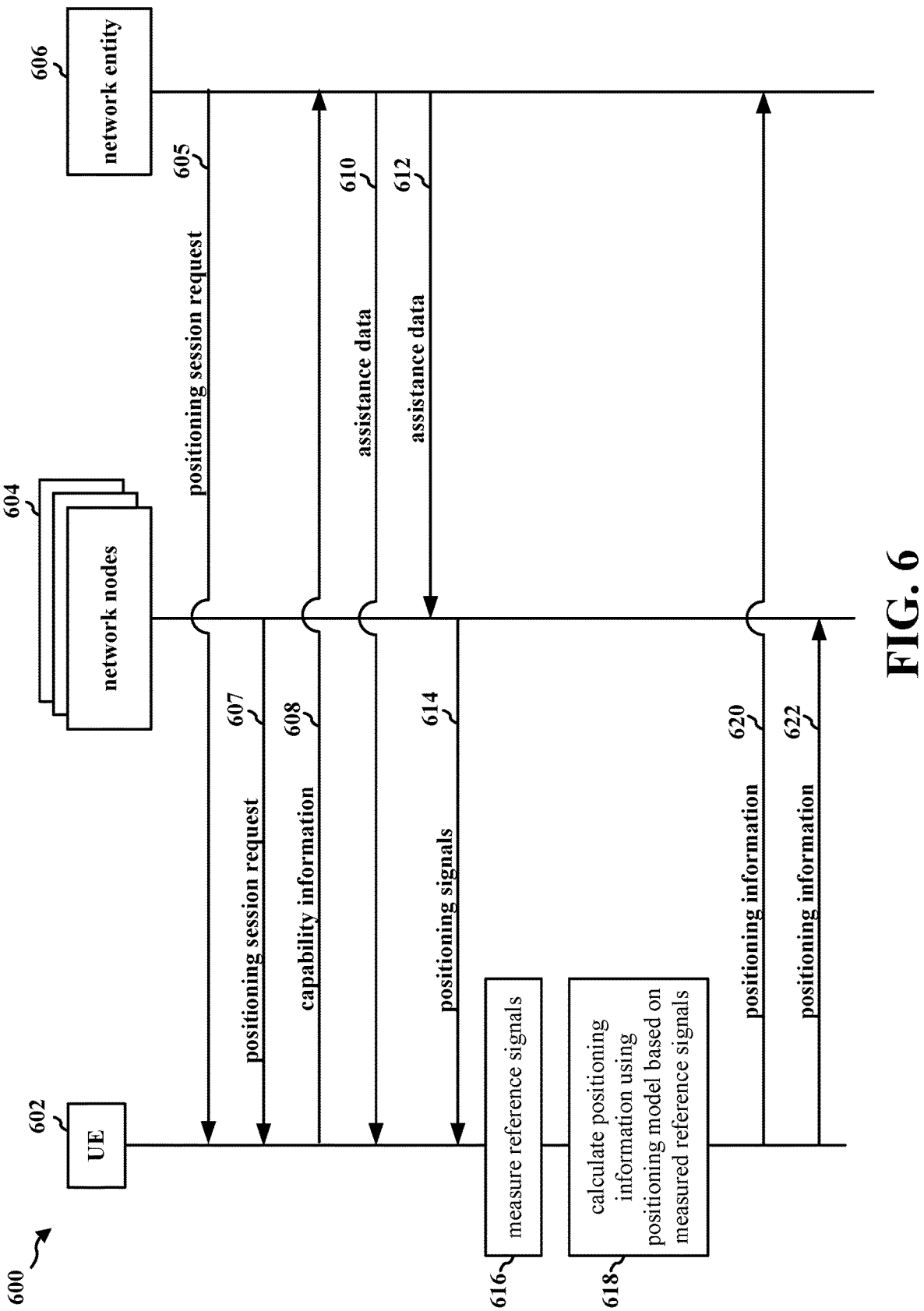
FIG. 6 is a connection flow diagram illustrating signaling for configuration of positioning using reference signals (RSs) received from a plurality of transmission reception points (TRPs), in accordance with various aspects of the present disclosure.

FIG. 6 is a connection flow diagram 600 illustrating signaling for configuration of positioning between the UE 602 and the plurality of network nodes 604 by the network entity 606. The plurality of network nodes 604 may represent a plurality of TRPs of one or more base stations in a network.

In some aspects, the UE 602 may calculate positioning information using a positioning model based on a MT-LR message or a NI-LR message. For example, the network entity 606 may transmit a positioning session request 605 to the UE 602. The UE 602 may receive the positioning session request 605 from the network entity 606. The positioning session request 605 may include an MT-LR message or an NI-LR message requesting the UE 602 to perform a positioning session. The positioning session request 605 may include a configuration for the UE 602 to receive a set of positioning signals 614. In another example, at least one of the plurality of network nodes 604, such as a network node serving the UE 602, may transmit a positioning session request 607 to the UE 602. The UE 602 may receive the positioning session request 607 from at least one of the plurality of network nodes 604. The positioning session request 607 may include an MT-LR message or an NI-LR message requesting the UE 602 to perform a positioning session. The positioning session request 607 may include a configuration for the UE 602 to receive a set of positioning signals 614.

The UE 602 may transmit capability information 608 to the network entity 606. The network entity 606 may receive the capability information 608. The UE 602 may transmit the capability information 608 in response to receiving a positioning session request, or a configuration for a positioning session. In some aspects, the capability information 608 may include an MO-LR message requesting a positioning session. The capability information 608 may include, for example, a UE capability to provide the positioning information 620 for a positioning model associated with a site of the UE 602. The site may be a zone that the UE 602 is currently connected to. The site may be associated with a serving cell or a range of latitudes, range of longitudes, and/or a range of heights/elevation levels. The capability information 608 may include at least one of (a) a timing gap condition (e.g., a standard, specification, or requirement) between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, and/or (g) a set of zone information associated with the positioning model. The timing gap condition may be a minimum timing gap between positioning signals transmitted to the UE 602 for the UE 602 to be able to receive and measure the positioning signals. The timing gap condition may be associated with orthogonal or non-orthogonal RS resources. The maximum number of network nodes may be a maximum number of TRPs that a set of positioning models available to the UE 602 may be able to handle. The UE 602 may indicate a set of numbers of network nodes along with a set of positioning model indicators associated with corresponding maximum numbers. The BW range may be a range of BWs that a set of positioning models available to the UE 602 may have been trained with. The UE 602 may indicate a set of BW ranges along with a set of positioning model indicators associated with corresponding BW ranges. The set of RS resources may be a set of RS resources that a set of positioning models available to the UE 602 may have been trained with. The set of RS resources may include a set of non-orthogonal resources and/or a set of orthogonal resources. In some aspects, the UE 602 may indicate whether it may be able to receive and measure orthogonal and/or non-orthogonal resources for calculating positioning information. In some aspects, the capability information 608 may include quantities that are associated with the positioning information that a set of positioning models available to the UE 602 may calculate. For example, the capability information 608 may indicate a number of ToAs, a number of RSTDs, and/or a number of LOSs that the UE 602 may calculate using the set of positioning models. The capability information 608 may include types of positioning information that the UE 602 may calculate using a set of positioning models available to the UE 602. For example, the capability information 608 may indicate that the UE 602 may calculate a ToA, an RSTD, an AoD, and/or a LOS identification based on the positioning signal measurements. The set of zone information may include a range of latitudes, a range of longitudes, and/or a range of heights associated with a set of positioning models available to the UE 602. The set of positioning information types may include at least one of (a) a ToA, (b) an RSTD, (c) an AoD, or (d) an indication of an LOS identification. A LOS identification may be an identification of whether there exists a LOS between the UE 602 and one of the plurality of network nodes 604. For example, whether a blocker or a reflector is between the UE 602 and an antenna of a TRP of the plurality of network nodes 604. The maximum quantity may include at least one of (a) a quantity of ToA values, (b) a quantity of RSTD values, and/or (c) a quality of LOS identification values. The set of zone information may include (a) a range of latitudes, (b) a range of longitudes, or (c) a range of elevations associated with a set of positioning models available to the UE 602.

The network entity 606 may transmit assistance data 610 to the UE 602. The UE 602 may receive the assistance data 610. The network entity 606 may transmit assistance data 612 to the plurality of network nodes 604. The plurality of network nodes 604 may receive the assistance data 612. The assistance data 610 and the assistance data 612 may have the same, or different, contents from one another. The assistance data 610 and the assistance data 612 may be transmitted using the same, or different, protocol. For example, the assistance data 610 may be an LTE positioning protocol (LPP) annex (LPPa) message, and the assistance data 612 may include an NR positioning protocol (NRPP) annex (NRPPa) message. The network entity 606 may transmit the assistance data in response to receiving the capability information 608 from the UE 602. The capability information 608 may include an MO-LR message. The assistance data may configure the UE 602 and the plurality of network nodes 604 to perform positioning utilizing the set of positioning signals 614 transmitted from the plurality of network nodes 604 to the UE 602. In some aspects, the network entity 606 may configure the assistance data at least in part based on the capability information 608. For example, the network entity 606 may configure the set of positioning signals 614 to be transmitted from a set of TRPs that are less than or equal to the maximum number of TRPs that the UE 602 indicated in the capability information 608. The assistance data may include at least one of (a) an indication of a set of reference TRP IDs associated with the plurality of network nodes 604, (b) a configuration associated with at least some of the set of positioning signals 614, (c) an indication of an orthogonality associated with at least some of the set of positioning signals 614, (d) an indication of a correlation between at least one network node of the plurality of network nodes 604 with a positioning signal resource, (e) an indication of a set of RS IDs associated with at least some of the set of positioning signals 614, or (f) a reporting configuration. The reporting configuration may be a configuration for the UE 602 to report the positioning information 620 to the network entity 606, and/or for the UE 602 to report the positioning information 622 to at least one of the plurality of network nodes 604, such as a base station serving the UE 602. The reporting configuration may include at least one of (a) an indication of a period between transmissions of the positioning information, (b) an indication of an event that triggers the transmission of the positioning information, and/or (c) an indication of a quantity of measurements associated with the positioning information (e.g., how many measurements should be included in the report). The indication of the quantity of measurements may include a TRP identifier (ID) or a cell ID associated with the network node and an RS ID associated with the positioning signal resource (e.g., PRS ID and PRS resource). The indication of orthogonality may indicate whether or not a set of positioning signal resources are orthogonal, or may identify the positioning signal resources used for the set of positioning signals 614. The assistance data may correlate network nodes of the plurality of network nodes 604 with certain positioning signal resources, allowing the UE 602 to differentiate between TRP sources by analyzing the positioning signal resources. In some aspects, the network entity 606 may transmit at least some of the assistance data in the positioning session request 605.

The plurality of network nodes 604 may transmit the set of positioning signals 614 to the UE 602. The UE 602 may receive the set of positioning signals 614 from the plurality of network nodes 604. The set of positioning signals 614 may be, for example, positioning reference signals (PRSs), channel state information (CSI) reference signals (CSI-RSs), or synchronization signal blocks (SSBs).

At 616, the UE 602 may measure the set of positioning signals 614. In some aspects, the UE 602 may measure each of the set of positioning signals 614 individually. For example, the set of positioning signals 614 may be transmitted in separate time periods, or may be transmitted in the same time period orthogonal to one another, allowing the UE 602 to separate the set of positioning signals 614 and measure each of the set of positioning signals 614 individually. The plurality of network nodes 604 may transmit the set of positioning signals 614 with timing gaps that match a timing gap condition transmitted by the UE 602 in the capability information 608. In some aspects, the UE 602 may construct a composite measurement of the set of positioning signals 614. For example, at least some of the set of positioning signals 614 may be transmitted in the same time period, and the UE 602 may measure all of the set of positioning signals 614 transmitted from each of the plurality of network nodes 604 in the same time period as a single measurement. In other words, the UE 602 may perform a joint measurement of a plurality of the set of positioning signals 614. In such an aspect, the set of positioning signals 614 may be orthogonal to one another, or may be non-orthogonal to one another. In some aspects, the orthogonal and non-orthogonal signals of the set of positioning signals 614 may be transmitted in different time periods relative to one another (e.g., transmitted serially, transmitted in alternating occasions). In other aspects, the orthogonal and non-orthogonal RSs of the set of positioning signals 614 may be transmitted during the same time period when orthogonality is achieved in a frequency domain. For example, three resources may be transmitted during the same time period, where the first resource is orthogonal in the frequency domain (i.e., the RS associated with the first resource has different mapping to subcarriers when compared to the second and third resources), where the second resource and the third resource are non-orthogonal to one another, where the second and third resource share the same subcarriers, where the first resource is orthogonal to the second resource, and where the first resource is orthogonal to the third resource. By constructing a composite measurement of the set of positioning signals 614, the UE 602 may save resources by avoiding complex computations used to separate orthogonal RSs from one another.

At 618, the UE 602 may calculate positioning information using a positioning model associated with a site of the UE, for example a zone that the positioning model was trained in. The UE 602 may select a positioning model to use from a set of positioning models available to the UE 602 based on the assistance data 610. The UE 602 may input the measured values from measuring the set of positioning signals 614 at 616 into the positioning model, and the positioning model may estimate and/or calculate a result, such as a location of the UE 602, or an intermediate positioning measurement, such as a ToA, RSTD, AoD, and/or LOS identification. In some aspects, the UE 602 may also input at least some of the assistance data 610 into the positioning model as inputs, or may calculate at least some inputs based on the assistance data 610. For example, the UE 602 may correlate positioning signal measurements with TRP IDs and/or PRS IDs based on the assistance data, and may input the correlating IDs into the positioning model along with the positioning signal measurements. The UE 602 may transmit at least some of the positioning information as the positioning information 620 to the network entity 606. The network entity 606 may receive the positioning information 620. The UE 602 may transmit at least some of the positioning information as the positioning information 622 to at least some of the plurality of network nodes 604. The UE 602 may transmit the positioning information 620 and/or the positioning information 622 based on a reporting configuration indicated in the assistance data 610.

Figure 7:
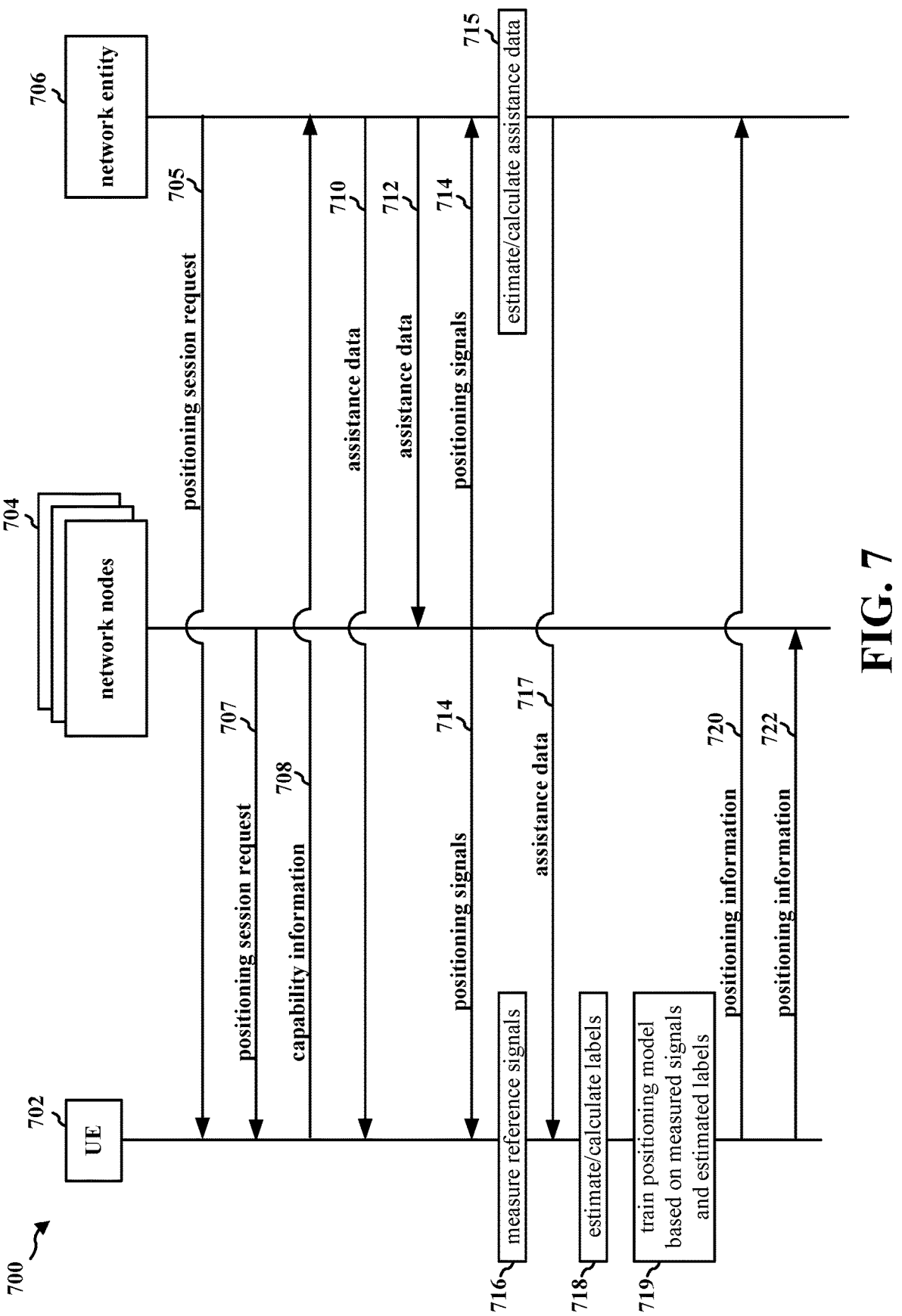
FIG. 7 is a connection flow diagram illustrating signaling for training of a positioning model based on positioning using RSs received from a plurality of TRPs, in accordance with various aspects of the present disclosure.

FIG. 7 is a connection flow diagram 700 illustrating a UE 702 configured to train a positioning model based on estimated labels of the UE 702 and a set of positioning signals 714 transmitted by the plurality of network nodes 704 to the UE 702. The plurality of network nodes 704 may represent a plurality of TRPs of one or more base stations in a network.

In some aspects, the UE 702 may collect data for training a positioning model based on a MT-LR message or a NI-LR message. For example, the network entity 706 may transmit a positioning session request 705 to the UE 702. The UE 702 may receive the positioning session request 705 from the network entity 706. The positioning session request 705 may include an MT-LR message or an NI-LR message requesting the UE 702 to perform a positioning session. The positioning session request 705 may include a configuration for the UE 702 to receive a set of positioning signals 714. In another example, at least one of the plurality of network nodes 704, such as a network node serving the UE 702, may transmit a positioning session request 707 to the UE 702. The UE 702 may receive the positioning session request 707 from at least one of the plurality of network nodes 704. The positioning session request 707 may include an MT-LR message or an NI-LR message requesting the UE 702 to perform a positioning session. The positioning session request 707 may include a configuration for the UE 702 to receive a set of positioning signals 714.

The UE 702 may transmit capability information 708 to the network entity 706. The network entity 706 may receive the capability information 708. The UE 702 may transmit the capability information 708 in response to receiving a positioning session request, or a configuration for a positioning session. In some aspects, the capability information

708 may include an MO-LR message requesting a positioning session. The capability information 708 may include, for example, a UE capability to provide the positioning information 720 to train a positioning model associated with a site of the UE 702. The capability information 708 may include, for example, a UE capability to collect measurement information and/or training labels for training a positioning model associated with a site of the UE 702. The site may be a zone that the UE 702 is currently connected to. The site may be associated with a serving cell or a range of latitudes, range of longitudes, and/or a range of heights/ elevation levels. The capability information 708 may include at least one of (a) a timing gap condition (e.g., a standard, specification, or requirement) between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, and/or (g) a set of zone information associated with the UE 702. The timing gap condition may be a minimum timing gap between positioning signals transmitted to the UE 702 for the UE 702 to be able to receive and measure the positioning signals. The timing gap condition may be associated with orthogonal or non-orthogonal RS resources. The maximum number of network nodes may be a maximum number of TRPs that the UE 702 may be able to handle, or that the positioning model that the UE 702 is training is able to handle (e.g., the positioning model may have historically been trained with a maximum number of TRPs). The BW range may be a range of BWs that the UE 702 may be able to receive and measure. The set of RS resources may be a set of RS resources that the UE 702 is able to receive and measure. The set of RS resources may include a set of non-orthogonal resources and/or a set of orthogonal resources. In some aspects, the UE 702 may indicate whether it may be able to receive and measure orthogonal and/or non-orthogonal resources for calculating positioning information and/or for training a positioning model. In some aspects, the capability information 708 may include quantities that are associated with a set of labels that the UE 702 may calculate. For example, the capability information 708 may indicate a number of ToAs, a number of RSTDs, and/or a number of LOSs that the UE 702 may calculate using positioning measurements or other sensors at the UE 702. The capability information 708 may include types of labels that the UE 702 may calculate. For example, the capability information 708 may indicate that the UE 702 may estimate one or more ToAs, RSTDs, AoDs, and/or LOS identifications for labels of a positioning model. The set of zone information may include a range of latitudes, a range of longitudes, and/or a range of heights associated with the UE 702, within a margin of error. The set of positioning information types may include at least one of (a) a ToA, (b) an RSTD, (c) an AoD, or (d) an indication of an LOS identification. A LOS identification may be an identification of whether there exists a LOS between the UE 702 and one of the plurality of network nodes 704. For example, whether a blocker or a reflector is between the UE 702 and an antenna of a TRP of the plurality of network nodes 704. The maximum quantity may include at least one of (a) a quantity of ToA values, (b) a quantity of RSTD values, and/or (c) a quality of LOS identification values. The set of zone information may include (a) a range of latitudes, (b) a range of longitudes, or (c) a range of elevations associated with the UE 702, within a margin of error.

The network entity 706 may transmit assistance data 710 to the UE 702. The UE 702 may receive the assistance data 710. The network entity 706 may transmit assistance data 712 to the plurality of network nodes 704. The plurality of network nodes 704 may receive the assistance data 712. The assistance data 710 and the assistance data 712 may have the same, or different, contents from one another. The assistance data 710 and the assistance data 712 may be transmitted using the same, or different, protocol. For example, the assistance data 710 may be an LPPa message, and the assistance data 712 may include an NRPPa message. The network entity 706 may transmit the assistance data in response to receiving the capability information 708 from the UE 702. The capability information 708 may include an MO-LR message. The assistance data may configure the UE 702 and the plurality of network nodes 704 to perform positioning utilizing the set of positioning signals 714 transmitted from the plurality of network nodes 704 to the UE 702. In some aspects, the network entity 706 may configure the assistance data at least in part based on the capability information 708. For example, the network entity 706 may configure the set of positioning signals 714 to be transmitted from a set of TRPs that are less than or equal to the maximum number of TRPs that the UE 702 indicated in the capability information 708. The assistance data may include at least one of (a) an indication of a set of reference TRP IDs associated with the plurality of network nodes 704, (b) a configuration associated with at least some of the set of positioning signals 714, (c) an indication of an orthogonality associated with at least some of the set of positioning signals 714, (d) an indication of a correlation between at least one network node of the plurality of network nodes 704 with a positioning signal resource, (e) an indication of a set of RS IDs associated with at least some of the set of positioning signals 714, or (f) a reporting configuration. The reporting configuration may be a configuration for the UE 702 to report the positioning information 720 to the network entity 706, and/or for the UE 702 to report the positioning information 722 to at least one of the plurality of network nodes 704, such as a base station serving the UE 702. The reporting configuration may include at least one of (a) an indication of a period between transmissions of the positioning information, (b) an indication of an event that triggers the transmission of the positioning information, and/or (c) an indication of a quantity of measurements associated with the positioning information (e.g., how many measurements should be included in the report). The indication of the quantity of measurements may include a TRP ID or a cell ID associated with the network node and an RS ID associated with the positioning signal resource (e.g., PRS ID and PRS resource). The indication of orthogonality may indicate whether or not a set of positioning signal resources are orthogonal, or may identify the positioning signal resources used for the set of positioning signals 714. The assistance data may correlate network nodes of the plurality of network nodes 704 with certain positioning signal resources, allowing the UE 702 to differentiate between TRP sources by analyzing the positioning signal resources. In some aspects, the network entity 706 may transmit at least some of the assistance data in the positioning session request 705.

The plurality of network nodes 704 may transmit the set of positioning signals 714 to the UE 702. The UE 702 may receive the set of positioning signals 714 from the plurality of network nodes 704. In some aspects, the plurality of network nodes 704 may also transmit the set of positioning signals 714 to the network entity 706. The network entity 706 may receive the set of RSs from the plurality of network nodes 704. The set of positioning signals 714 may be, for example, PRSs or CSI-RSs.

At 716, the UE 702 may measure the set of positioning signals 714. In some aspects, the UE 702 may measure each of the set of positioning signals 714 individually. For example, the set of positioning signals 714 may be transmitted in separate time periods, or may be transmitted in the same time period orthogonal to one another, allowing the UE 702 to separate the set of positioning signals 714 and measure each of the set of positioning signals 714 individually. The plurality of network nodes 704 may transmit the set of positioning signals 714 with timing gaps that match a timing gap condition transmitted by the UE 702 in the capability information 708. In some aspects, the UE 702 may construct a composite measurement of the set of positioning signals 714. For example, at least some of the set of positioning signals 714 may be transmitted in the same time period, and the UE 702 may measure all of the set of positioning signals 714 transmitted from each of the plurality of network nodes 704 in the same time period as a single measurement. In other words, the UE 702 may perform a joint measurement of a plurality of the set of positioning signals 714. In such an aspect, the set of positioning signals 714 may be orthogonal to one another, or may be non-orthogonal to one another. In some aspects, the orthogonal and non-orthogonal signals of the set of positioning signals 714 may be transmitted in different time periods relative to one another (e.g., transmitted serially, transmitted in alternating occasions). In other aspects, the orthogonal and non-orthogonal RSs of the set of positioning signals 714 may be transmitted during the same time period when orthogonality is achieved in a frequency domain. By constructing a composite measurement of the set of positioning signals 714, the UE 702 may save resources by avoiding complex computations used to separate orthogonal RSs from one another.

At 715, the network entity 706 may estimate and/or calculate assistance data associated with the UE 702. The assistance data may be, for example, a location of the UE 702, or may be intermediate labels, such as a ToA, an RSTD, an AoD, or a LOS identification associated with the UE 702 and at least one of the plurality of network nodes 704. The network entity 706 may transmit the assistance data 717 to the UE 702. The UE 702 may receive the assistance data 717 for training a positioning model.

At 718, the UE 702 may estimate and/or calculate expected labels for training the positioning model. The UE 702 may utilize at least some of the assistance data 717 and/or the assistance data 710 to estimate and/or calculate the expected labels. The UE 702 may use other sensors to estimate and/or calculate the expected labels, for example by performing a GNSS fix using a GNSS sensor at the UE 702. At 719, the UE 702 may train the positioning model based on the measured values from measuring the set of positioning signals 714 at 716 and the expected labels calculated and/or estimated at 718. The UE 702 may train the positioning model at the UE 702. The UE 702 may transmit the collected data to a training entity (e.g., an OTT server, a network node, or the network entity) for training the positioning model. In some aspects, the UE 702 may then calculate positioning information based on the measured values from measuring the set of positioning signals 714 at 716 to determine how close the UE 702 may calculate positioning information based on the training. In some aspects, the UE 702 may transmit at least some of the positioning information as the positioning information 720 to the network entity 706. The network entity 706 may receive the positioning information 720. The UE 702 may transmit at least some of the positioning information as the positioning information 722 to at least some of the plurality of network nodes 704. The positioning information 720 and/or the positioning information 722 may be an estimated location of the UE 702. As such, the UE 702 may both collect data for training a positioning model, while also performing positioning for at least some of the plurality of network nodes 704 and/or the network entity 706.

Figure 8:
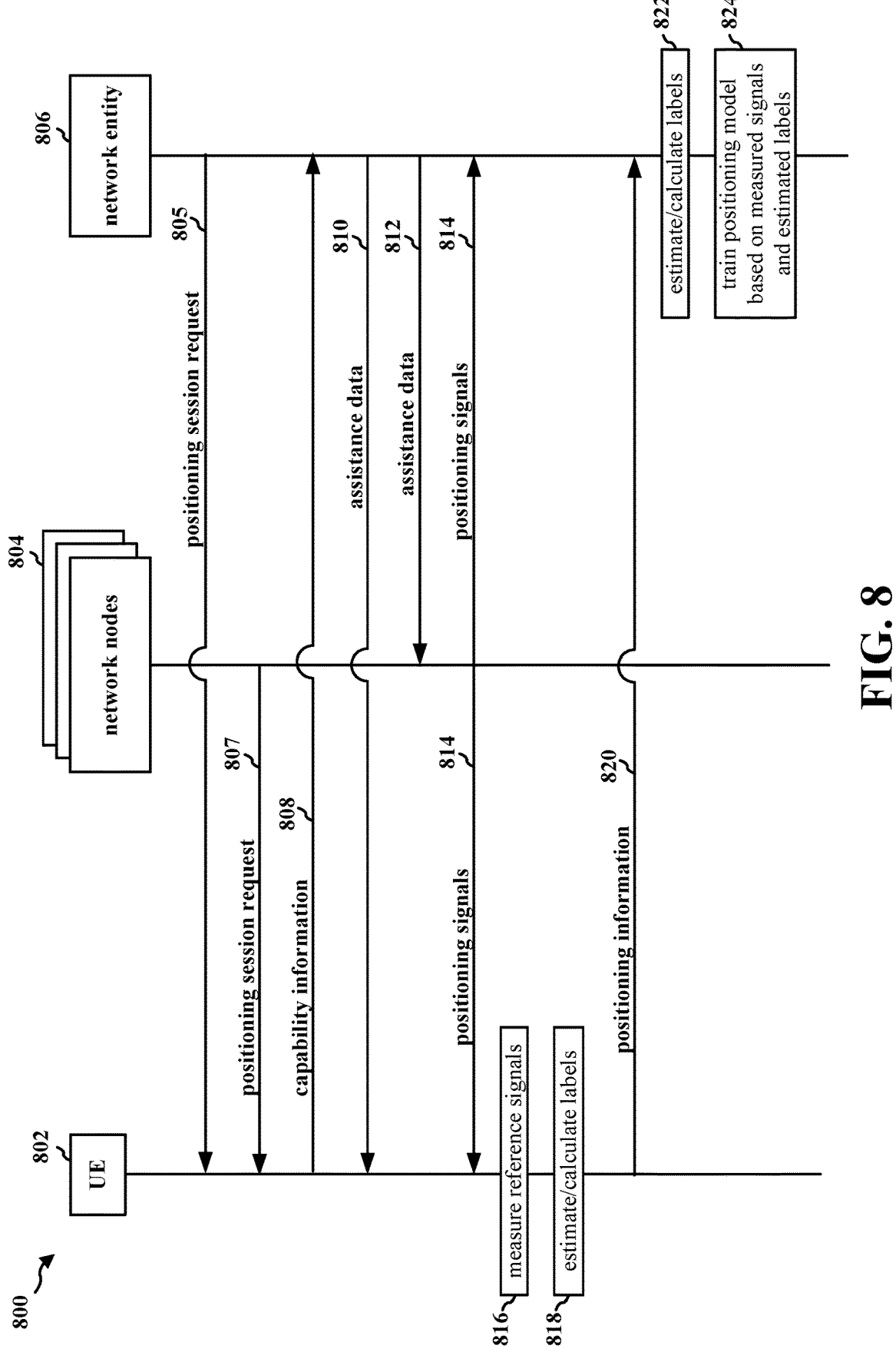
FIG. 8 is a connection flow diagram illustrating signaling for training of a positioning model based on positioning using RSs received from a plurality of TRPs, in accordance with various aspects of the present disclosure.

FIG. 8 is a connection flow diagram 800 illustrating a network entity 806 configured to train a positioning model based on estimated labels of the UE 802 and a set of positioning signals 814 transmitted by the plurality of network nodes 804 to the UE 802. The plurality of network nodes 804 may represent a plurality of TRPs of one or more base stations in a network.

In some aspects, the UE 802 may collect data for training a positioning model based on a MT-LR message or a NI-LR message. For example, the network entity 806 may transmit a positioning session request 805 to the UE 802. The UE 802 may receive the positioning session request 805 from the network entity 806. The positioning session request 805 may include an MT-LR message or an NI-LR message requesting the UE 802 to perform a positioning session. The positioning session request 805 may include a configuration for the UE 802 to receive a set of positioning signals 814. In another example, at least one of the plurality of network nodes 804, such as a network node serving the UE 802, may transmit a positioning session request 807 to the UE 802. The UE 802 may receive the positioning session request 807 from at least one of the plurality of network nodes 804. The positioning session request 807 may include an MT-LR message or an NI-LR message requesting the UE 802 to perform a positioning session. The positioning session request 807 may include a configuration for the UE 802 to receive a set of positioning signals 814.

The UE 802 may transmit capability information 808 to the network entity 806. The network entity 806 may receive the capability information 808. The UE 802 may transmit the capability information 808 in response to receiving a positioning session request, or a configuration for a positioning session. In some aspects, the capability information 808 may include an MO-LR message requesting a positioning session. In some aspects, the network entity 806 may collect training data for training a positioning model in response to receiving the capability information 808. The capability information 808 may include, for example, a UE capability to provide the positioning information 820 to train a positioning model associated with a site of the UE 802. The capability information 808 may include, for example, a UE capability to collect measurement information and/or training labels for training a positioning model associated with a site of the UE 802. The site may be a zone that the UE 802 is currently connected to. The site may be associated with a serving cell or a range of latitudes, range of longitudes, and/or a range of heights/elevation levels. The capability information 808 may include at least one of (a) a timing gap condition (e.g., a standard, specification, or requirement) between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, and/or (g) a set of zone information associated with the UE 802. The timing gap condition may be a minimum timing gap between positioning signals transmitted to the UE 802 for the UE 802 to be able to receive and measure the positioning signals. The timing gap condition may be associated with orthogonal or non-orthogonal RS resources. The maximum number of network nodes may be a maximum number of TRPs that the UE 802 may be able to handle, or that the positioning model that the UE 802 is training is able to handle (e.g., the positioning model may have historically been trained with a maximum number of TRPs). The BW range may be a range of BWs that the UE 802 may be able to receive and measure. The set of RS resources may be a set of RS resources that the UE 802 is able to receive and measure. The set of RS resources may include a set of non-orthogonal resources and/or a set of orthogonal resources. In some aspects, the UE 802 may indicate whether it may be able to receive and measure orthogonal and/or non-orthogonal resources for calculating positioning information and/or for training a positioning model. In some aspects, the capability information 808 may include quantities that are associated with a set of labels that the UE 802 may calculate. For example, the capability information 808 may indicate a number of ToAs, a number of RSTDs, and/or a number of LOSs that the UE 802 may calculate using positioning measurements or other sensors at the UE 802. The capability information 808 may include types of labels that the UE 802 may calculate. For example, the capability information 808 may indicate that the UE 802 may estimate one or more ToAs, RSTDs, AoDs, and/or LOS identifications for labels of a positioning model. The set of zone information may include a range of latitudes, a range of longitudes, and/or a range of heights associated with the UE 802, within a margin of error. The set of positioning information types may include at least one of (a) a ToA, (b) an RSTD, (c) an AoD, or (d) an indication of an LOS identification. A LOS identification may be an identification of whether there exists a LOS between the UE 802 and one of the plurality of network nodes 804. For example, whether a blocker or a reflector is between the UE 802 and an antenna of a TRP of the plurality of network nodes 804. The maximum quantity may include at least one of (a) a quantity of ToA values, (b) a quantity of RSTD values, and/or (c) a quality of LOS identification values. The set of zone information may include (a) a range of latitudes, (b) a range of longitudes, or (c) a range of elevations associated with the UE 802, within a margin of error.

The network entity 806 may transmit assistance data 810 to the UE 802. The UE 802 may receive the assistance data 810. The network entity 806 may transmit assistance data 812 to the plurality of network nodes 804. The plurality of network nodes 804 may receive the assistance data 812. The assistance data 810 and the assistance data 812 may have the same, or different, contents from one another. The assistance data 810 and the assistance data 812 may be transmitted using the same, or different, protocol. For example, the assistance data 810 may be an LPPa message, and the assistance data 812 may include an NRPPa message. The network entity 806 may transmit the assistance data in response to receiving the capability information 808 from the UE 802. The capability information 808 may include an MO-LR message. The assistance data may configure the UE 802 and the plurality of network nodes 804 to perform positioning utilizing the set of positioning signals 814 transmitted from the plurality of network nodes 804 to the UE 802. In some aspects, the network entity 806 may configure the assistance data at least in part based on the capability information 808. For example, the network entity 806 may configure the set of positioning signals 814 to be transmitted from a set of TRPs that are less than or equal to the maximum number of TRPs that the UE 802 indicated in the capability information 808. The assistance data may include at least one of (a) an indication of a set of reference TRP IDs associated with the plurality of network nodes 804, (b) a configuration associated with at least some of the set of positioning signals 814, (c) an indication of an orthogonality associated with at least some of the set of positioning signals 814, (d) an indication of a correlation between at least one network node of the plurality of network nodes 804 with a positioning signal resource, (e) an indication of a set of RS IDs associated with at least some of the set of positioning signals 814, or (f) a reporting configuration. The reporting configuration may be a configuration for the UE 802 to report the positioning information 820 to the network entity 806. The reporting configuration may include at least one of (a) an indication of a period between transmissions of the positioning information, (b) an indication of an event that triggers the transmission of the positioning information, and/or (c) an indication of a quantity of measurements associated with the positioning information (e.g., how many measurements should be included in the report). The indication of the quantity of measurements may include a TRP ID or a cell ID associated with the network node and an RS ID associated with the positioning signal resource (e.g., PRS ID and PRS resource). The indication of orthogonality may indicate whether or not a set of positioning signal resources are orthogonal, or may identify the positioning signal resources used for the set of positioning signals 814. The assistance data may correlate network nodes of the plurality of network nodes 804 with certain positioning signal resources, allowing the UE 802 to differentiate between TRP sources by analyzing the positioning signal resources. In some aspects, the network entity 806 may transmit at least some of the assistance data in the positioning session request 805.

The plurality of network nodes 804 may transmit the set of positioning signals 814 to the UE 802. The UE 802 may receive the set of positioning signals 814 from the plurality of network nodes 804. In some aspects, the plurality of network nodes 804 may also transmit the set of positioning signals 814 to the network entity 806. The network entity 806 may receive the set of RSs from the plurality of network nodes 804. The set of positioning signals 814 may be, for example, PRSs or CSI-RSs.

At 816, the UE 802 may measure the set of positioning signals 814. In some aspects, the UE 802 may measure each of the set of positioning signals 814 individually. For example, the set of positioning signals 814 may be transmitted in separate time periods, or may be transmitted in the same time period orthogonal to one another, allowing the UE 802 to separate the set of positioning signals 814 and measure each of the set of positioning signals 814 individually. The plurality of network nodes 804 may transmit the set of positioning signals 814 with timing gaps that match a timing gap condition transmitted by the UE 802 in the capability information 808. In some aspects, the UE 802 may construct a composite measurement of the set of positioning signals 814. For example, at least some of the set of positioning signals 814 may be transmitted in the same time period, and the UE 802 may measure all of the set of positioning signals 814 transmitted from each of the plurality of network nodes 804 in the same time period as a single measurement. In other words, the UE 802 may perform a joint measurement of a plurality of the set of positioning signals 814. In such an aspect, the set of positioning signals 814 may be orthogonal to one another, or may be non-orthogonal to one another. In some aspects, the orthogonal and non-orthogonal signals of the set of positioning signals 814 may be transmitted in different time periods relative to one another (e.g., transmitted serially, transmitted in alternating occasions). In other aspects, the orthogonal and non-orthogonal RSs of the set of positioning signals 814 may be transmitted during the same time period when orthogonality is achieved in a frequency domain. By constructing a composite measurement of the set of positioning signals 814, the UE 802 may save resources by avoiding complex computations used to separate orthogonal RSs from one another.

At 818, the UE 802 may estimate and/or calculate expected labels for training the positioning model. The UE 802 may use other sensors to estimate and/or calculate the expected labels, for example by performing a GNSS fix using a GNSS sensor at the UE 802. The UE 802 may calculate the expected labels based on the measured values of the set of positioning signals 814 measured at 816. The UE 802 may transmit at least some of the expected labels as the positioning information 820 to the network entity 806. The UE 802 may transmit at least some of the measured values from measuring the set of positioning signals 814 at 816 as the positioning information 820 to the network entity 806.

At 822, the network entity 806 may estimate and/or calculate expected labels for the positioning model. The network entity 806 may use at least some of the positioning information 820 from the UE 802 to estimate and/or calculate the expected labels. At 824, the network entity 806 may train the positioning model based on the measured signals and estimated labels. In some aspects, the network entity 806 may train the positioning model at the network entity 806. In some aspects, the network entity 806 may transmit the training data to a training entity (e.g., a UE, an OTT server, a network node, another network entity) for training the positioning model. In some aspects, the positioning information 820 may include an estimated location of the UE 802. In some aspects, the estimated labels calculated at 822 may include an estimated location of the UE 802. As such, the network entity 806 may both collect data for training a positioning model, while also performing positioning to estimate a location of the UE 802.

FIG. 9 is a flowchart 900 of a method of wireless communication. The method may be performed by a UE (e.g., the UE 104, the UE 350, the UE 602, the UE 702, the UE 802; the wireless device 404; the apparatus 1304). At 902, the UE may receive a set of RSs from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another and may be received during a same time period. For example, 902 may be performed by the UE 602 in FIG. 6, which may receive the set of positioning signals 614 from each of the plurality of network nodes 604. The set of positioning signals 614 may include a first subset of RSs from a first network node of the plurality of network nodes 604 and a second subset of RSs from a second network node of the plurality of network nodes 604. The first subset of RSs and the second subset of RSs may be non-orthogonal relative to one another and may be received during a same time period. Moreover, 902 may be performed by the component 198 in FIG. 1, 3, or 13.

At 904, the UE may measure the set of RSs from each of the plurality of network nodes received during the same time period. For example, 904 may be performed by the UE 602 in FIG. 6, which may, at 616, measure the set of positioning signals 614 from each of the plurality of network nodes 604 received during the same time period. The UE 602 may perform a joint measurement of the first subset of RSs and the second subset of RSs that are non-orthogonal relative to one another. Moreover, 904 may be performed by the component 198 in FIG. 1, 3, or 13.

At 906, the UE may transmit, for a network entity, positioning information associated with measuring the set of RSs from each of the plurality of network nodes. For example, 906 may be performed by the UE 602 in FIG. 6, which may transmit, for the network entity 606, the positioning information 620 associated with measuring the set of positioning signals 614 from each of the plurality of network nodes 604. Moreover, 906 may be performed by the component 198 in FIG. 1, 3, or 13.

FIG. 10 is a flowchart 1000 of a method of wireless communication. The method may be performed by a UE (e.g., the UE 104, the UE 350, the UE 602, the UE 702, the UE 802; the wireless device 404; the apparatus 1304). At 1002, the UE may receive a set of RSs from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another and may be received during a same time period. For example, 1002 may be performed by the UE 602 in FIG. 6, which may receive the set of positioning signals 614 from each of the plurality of network nodes 604. The set of positioning signals 614 may include a first subset of RSs from a first network node of the plurality of network nodes 604 and a second subset of RSs from a second network node of the plurality of network nodes 604. The first subset of RSs and the second subset of RSs may be non-orthogonal relative to one another and may be received during a same time period. Moreover, 1002 may be performed by the component 198 in FIG. 1, 3, or 13.

At 1004, the UE may measure the set of RSs from each of the plurality of network nodes received during the same time period. For example, 1004 may be performed by the UE 602 in FIG. 6, which may, at 616, measure the set of positioning signals 614 from each of the plurality of network nodes 604 received during the same time period. The UE 602 may perform a joint measurement of the first subset of RSs and the second subset of RSs that are non-orthogonal relative to one another. Moreover, 1004 may be performed by the component 198 in FIG. 1, 3, or 13.

At 1005, the UE may calculate the positioning information using a positioning model based on the measured set of RSs from each of the plurality of network nodes. For example, 1005 may be performed by the UE 602 in FIG. 6, which may, at 618, calculate the positioning information using a positioning model at the UE 602 based on measurements of the set of positioning signals 614 from each of the plurality of network nodes, where the set of positioning signals 614 were measured at 616. Moreover, 1005 may be performed by the component 198 in FIG. 1, 3, or 13.

At 1006, the UE may transmit, for a network entity, positioning information associated with measuring the set of RSs from each of the plurality of network nodes. For example, 1006 may be performed by the UE 602 in FIG. 6, which may transmit, for the network entity 606, the positioning information 620 associated with measuring the set of positioning signals 614 from each of the plurality of network nodes 604. Moreover, 1006 may be performed by the component 198 in FIG. 1, 3, or 13.

At 1008, the UE may transmit, for the network entity, a UE capability to provide the positioning information for a positioning model associated with a site of the UE. For example, 1008 may be performed by the UE 602 in FIG. 6, which may transmit, for the network entity 606, the capability information 608. The capability information 608 may include a capability of the UE 602 to provide the positioning information for a positioning model associated with a site of the UE 602, for example a location of the UE 602 or a zone of the UE 602. Moreover, 1008 may be performed by the component 198 in FIG. 1, 3, or 13.

At 1010, the UE may measure at least one RS for each of the plurality of network nodes. For example, 1010 may be performed by the UE 602 in FIG. 6, which may, at 616, measure the set of positioning signals 614. The UE 602 may measure at least one RS for each of the plurality of network nodes 604. Moreover, 1010 may be performed by the component 198 in FIG. 1, 3, or 13.

At 1012, the UE may construct a composite measurement of a third subset of the set of RSs for each of the plurality of network nodes. For example, 1012 may be performed by the UE 602 in FIG. 6, which may construct a composite measurement of a subset of the set of positioning signals 614 for each of the plurality of network nodes 604. In other words, the composite measurement taken at 616 may be of some, but not all, of the set of positioning signals 614. Moreover, 1012 may be performed by the component 198 in FIG. 1, 3, or 13.

At 1014, the UE may receive assistance data from an LMF, where the network entity may include the LMF. For example, 1014 may be performed by the UE 602 in FIG. 6, which may receive the assistance data 610 from the network entity 606. The network entity 606 may include an LMF. Moreover, 1014 may be performed by the component 198 in FIG. 1, 3, or 13.

At 1016, the UE may calculate the positioning information using the positioning model further based on the assistance data. For example, 1016 may be performed by the UE 602 in FIG. 6, which may, at 618, calculate the positioning information 620 and/or the positioning information 622 using the positioning model further based on the assistance data 610 received from the network entity 606. Moreover, 1016 may be performed by the component 198 in FIG. 1, 3, or 13.

FIG. 11 is a flowchart 1100 of a method of wireless communication. The method may be performed by a UE (e.g., the UE 104, the UE 350, the UE 602, the UE 702, the UE 802; the wireless device 404; the apparatus 1304). At 1102, the UE may receive a set of RSs from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another and may be received during a same time period. For example, 1102 may be performed by the UE 602 in FIG. 6, which may receive the set of positioning signals 614 from each of the plurality of network nodes 604. The set of positioning signals 614 may include a first subset of RSs from a first network node of the plurality of network nodes 604 and a second subset of RSs from a second network node of the plurality of network nodes 604. The first subset of RSs and the second subset of RSs may be non-orthogonal relative to one another and may be received during a same time period. Moreover, 1102 may be performed by the component 198 in FIG. 1, 3, or 13.

At 1104, the UE may measure the set of RSs from each of the plurality of network nodes received during the same time period. For example, 1104 may be performed by the UE 602 in FIG. 6, which may measure the set of positioning signals 614 from each of the plurality of network nodes 604 received during the same time period. Moreover, 1104 may be performed by the component 198 in FIG. 1, 3, or 13.

At 1106, the UE may transmit, for a network entity, positioning information associated with measuring the set of RSs from each of the plurality of network nodes. For example, 1106 may be performed by the UE 602 in FIG. 6, which may transmit, for the network entity 606, the positioning information 620 associated with measuring the set of positioning signals 614 from each of the plurality of network nodes 604. Moreover, 1106 may be performed by the component 198 in FIG. 1, 3, or 13.

At 1108, the UE may transmit a mobile originated location request (MO-LR) message. For example, 1108 may be performed by the UE 702 in FIG. 7, which may transmit an MO-LR message as part of the capability information 708. Moreover, 1108 may be performed by the component 198 in FIG. 1, 3, or 13.

At 1110, the UE may receive a location response based on the MO-LR message, where the location response may include a third subset of the set of predicted labels. For example, 1110 may be performed by the UE 702 in FIG. 7, which may receive the assistance data 717 from the network entity 706. The assistance data 717 may be transmitted in response to the network entity 706 receiving the MO-LR message. The assistance data 717 may include a set of predicted labels estimated/calculated at 715. Moreover, 1110 may be performed by the component 198 in FIG. 1, 3, or 13.

At 1112, the UE may train a positioning model based on a set of predicted labels associated with the positioning information and the measured set of RSs from each of the plurality of network nodes. For example, 1112 may be performed by the UE 702 in FIG. 7, which may, at 719, train a positioning model based on a set of predicted labels associated with the positioning information and the measured set of positioning signals 714 from each of the plurality of network nodes 704. Moreover, 1112 may be performed by the component 198 in FIG. 1, 3, or 13.

At 1114, the UE may receive a training trigger message that may include at least one of an MT-LR message or a network induced location request (NI-LR) message. For example, 1114 may be performed by the UE 702 in FIG. 7, which may receive a positioning session request 705 from the network entity 706 or a positioning session request 707 from at least one of the plurality of network nodes 704. The positioning session request 705 or the positioning session request 707 may include an MT-LR message or an NI-LR message. The UE 702 may be configured to collect training data for a positioning model in response to receiving an MT-LR message or an NI-LR message. Moreover, 1114 may be performed by the component 198 in FIG. 1, 3, or 13.

At 1116, the UE may calculate a first location of the UE based on at least one of a first indicator of a first location associated with a network node of the plurality of network nodes or a second indicator of a beam angle associated with an RS of the set of RSs, where the training trigger message may include at least one of the first indicator and the second indicator, where the set of predicted labels may include the calculated second location. For example, 1116 may be performed by the UE 702 in FIG. 7, which may, at 718, calculate a location of the UE 702 based on at least one of an indicator of a location associated with a network node of the plurality of network nodes 704 (e.g., by calculating its proximity from a known location of a TRP based on RTT or ToA information) or an indicator of a beam angle associated with a positioning signal of the set of positioning signals 714 (e.g., by calculating its angle offset from a known location of a TRP based on beam angle information). The MT-LR message or the NI-LR message may include at least one of the aforementioned indicators. The assistance data 710 may include at least one of the aforementioned indicators. The set of predicted labels may include the calculated location of the UE 702. Moreover, 1116 may be performed by the component 198 in FIG. 1, 3, or 13.

At 1118, the UE may train the positioning model in response to receiving the training trigger message. For example, 1118 may be performed by the UE 702 in FIG. 7, which may, at 719, train the positioning model in response to receiving the MT-LR message or the NI-LR message. Moreover, 1118 may be performed by the component 198 in FIG. 1, 3, or 13.

At 1120, the UE may transmit a set of positioning measurements based on the measured set of RSs to at least one of an over-the-top (OTT) server, a network node, or the network entity to train the positioning model. For example, 1120 may be performed by the UE 702 in FIG. 7, which may, at 719, transmit a set of positioning measurements based on the measured set of positioning signals 714 to at least one of an OTT server, a network node, or the network entity to train the positioning model. Moreover, 1120 may be performed by the component 198 in FIG. 1, 3, or 13.

Figure 12:
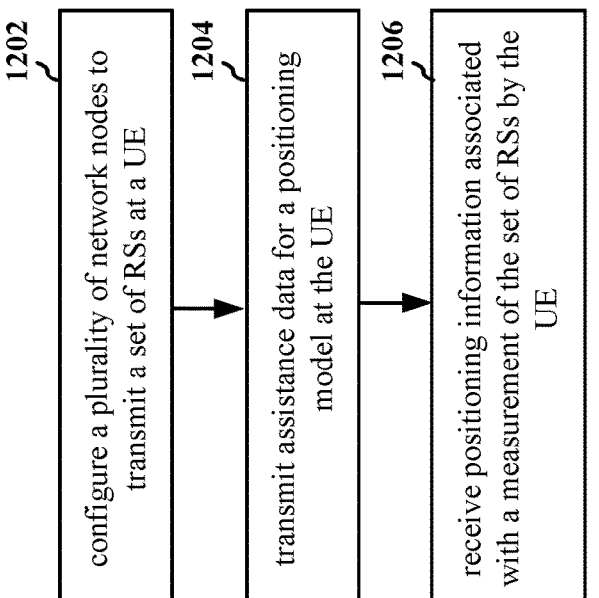
FIG. 12 is a flowchart of a method of wireless communication.

FIG. 12 is a flowchart 1200 of a method of wireless communication. The method may be performed by a network entity (e.g., the base station 102, the base station 310; the LMF 166, the set of location servers 168; the wireless device 402, the wireless device 406; the network entity 606, the network entity 706, the network entity 806; the network entity 1302, the network entity 1402, the network entity 1560). At 1202, the network entity may configure a plurality of network nodes to transmit a set of RSs at a UE. For example, 1202 may be performed by the network entity 606 in FIG. 6, which may configure a plurality of network nodes to transmit a set of RSs at a UE. Moreover, 1202 may be performed by the component 199 in FIG. 1, 3, 14, or 15.

At 1204, the network entity may transmit assistance data for a positioning model at the UE. For example, 1204 may be performed by the network entity 606 in FIG. 6, which may transmit assistance data for a positioning model at the UE. Moreover, 1204 may be performed by the component 199 in FIG. 1, 3, 14, or 15.

At 1206, the network entity may receive positioning information associated with a measurement of the set of RSs by the UE. For example, 1206 may be performed by the network entity 606 in FIG. 6, which may receive positioning information associated with a measurement of the set of RSs by the UE. Moreover, 1206 may be performed by the component 199 in FIG. 1, 3, 14, or 15.

Figure 13:
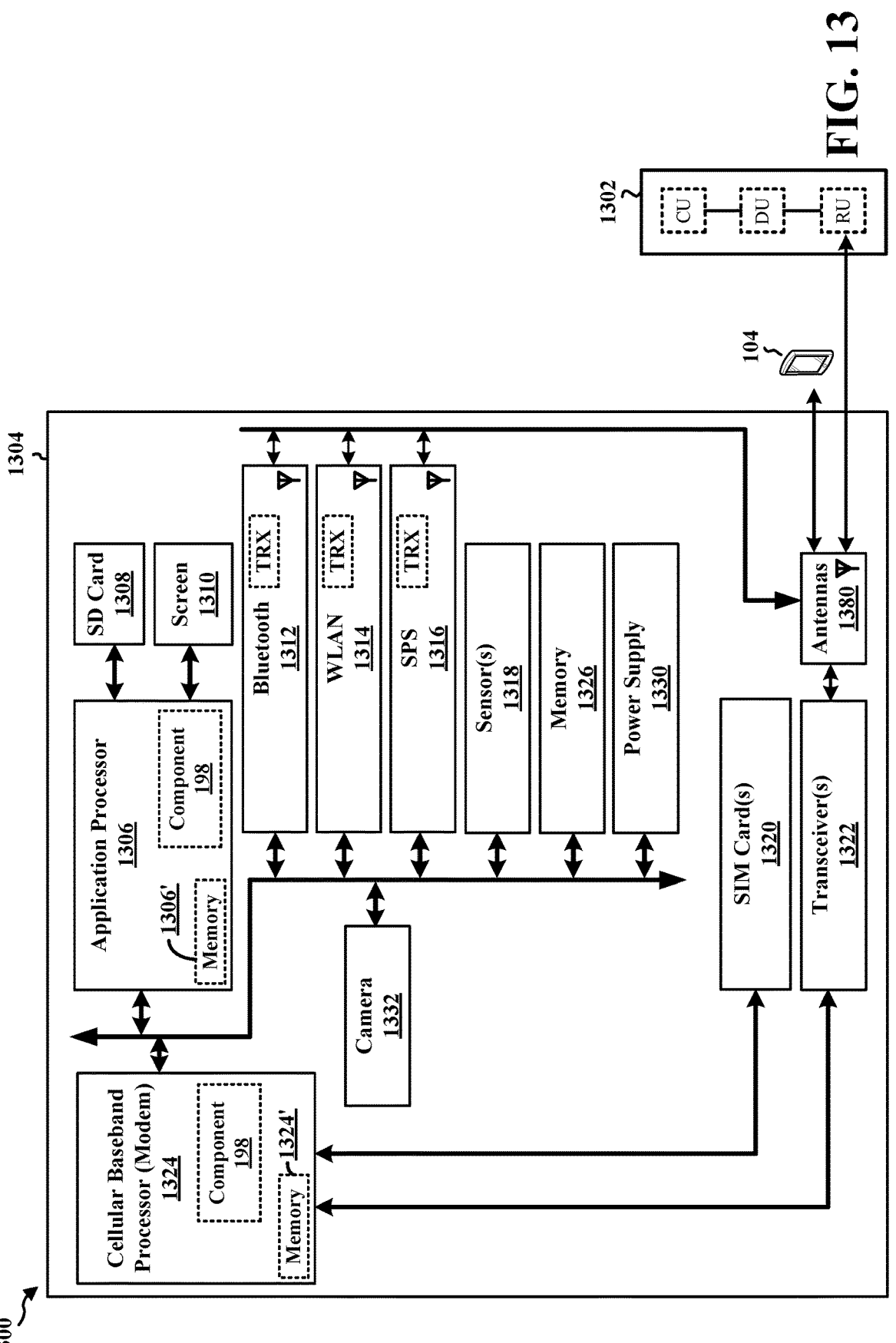
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus1204 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see UE 350 of FIG. 3) and include the additional modules of the apparatus 1304.

As discussed supra, the component 198 may be configured to receive a set of RSs from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another. The first subset of RSs and the second subset of RSs may be non-orthogonal relative to one another may be received during a same time period. The component 198 may be configured to measure the set of RSs from each of the plurality of network nodes received during the same time period. The component 198 may be configured to transmit, for a network entity, positioning information associated with measuring the set of RSs from each of the plurality of network nodes. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for receiving a set of RSs from each of a plurality of network nodes. The set of RSs may include a first subset of RSs from a first network node of the plurality of network nodes and a second subset of RSs from a second network node of the plurality of network nodes. The first subset of RSs and the second subset of RSs may be non-orthogonal relative to one another and may be received during a same time period. The apparatus 1304 may include means for measuring the set of RSs from each of the plurality of network nodes received during the same time period. The apparatus 1304 may include means for transmitting, for a network entity, positioning information associated with measuring the set of RSs from each of the plurality of network nodes. The apparatus 1304 may include means for calculating the positioning information using a positioning model and a set of positioning measurements based on measuring the set of RSs from each of the plurality of network nodes. The set of positioning measurements may include at least one positioning measurement associated with a third subset of the set of RSs for each of the plurality of network nodes. The apparatus 1304 may include means for calculating the set of positioning measurements by constructing a composite measurement based on at least one positioning measurement associated with a third subset of the set of RSs for each of the plurality of network nodes. The network entity may include an LMF. The apparatus 1304 may include means for receiving assistance data from the LMF. The apparatus 1304 may include means for calculating the positioning information using the positioning model based on the assistance data. The assistance data may include at least one of (a) a first indication of a set of reference TRP IDs associated with the plurality of network nodes, (b) a PRS configuration associated with a third subset of the set of RSs, (c) a second indication of an orthogonality associated with a fourth subset of the set of RSs, (d) a third indication of a correlation between a network node of the plurality of network nodes with a PRS resource, or (e) a reporting configuration. Transmitting the positioning information may include transmitting the positioning information based on the reporting configuration. The third indication may include a TRP ID associated with the network node and a PRS ID associated with the PRS resource. The reporting configuration may include at least one of (a) a fourth indication of a period between transmissions of the positioning information, (b) a fifth indication of an event that triggers the transmission of the positioning information, or (c) a sixth indication of a quantity of measurements associated with the positioning information. The apparatus 1304 may include means for measuring the set of RSs from each of the plurality of network nodes by calculating the positioning information using a positioning model and a set of positioning measurements based on measuring a third subset of the set of RSs from each of a fourth subset of the plurality of network nodes. The positioning information may include an indication of at least one of the third subset of the set of RSs or the fourth subset of the plurality of network nodes. The apparatus 1304 may include means for training a positioning model based on a set of predicted labels associated with the positioning information and a set of positioning measurements based on the measurement of the set of RSs from each of the plurality of network nodes. The apparatus 1304 may include means for transmitting a MO-LR message. The apparatus 1304 may include means for receiving a location response based on the MO-LR message. The location response may include a third subset of the set of predicted labels. The third subset of the set of predicted labels may include at least one of (a) a ToA, (b) an RSTD, (c) an AoD, (d) a first indication of an LOS identification, (e) a second indication of a set of PRS resources associated with the set of RSs or (f) a third indication of a set of TRPs associated with the plurality of network nodes. The location response may include a time stamp associated with each of the third subset of the set of predicted labels. The apparatus 1304 may include means for receiving a training trigger message including at least one of an MT-LR message, or an NI-LR message. The apparatus 1304 may include means for training the positioning model based on the set of predicted labels by training the positioning model in response to receiving the training trigger message. The training trigger message may include at least one of a first indicator of a first location associated with a network node of the plurality of network nodes and a second indicator of a beam angle associated with an RS of the set of RSs. The apparatus 1304 may include means for calculating a second location of the UE based on at least one of the first indicator or the second indicator. The set of predicted labels may include the calculated second location. The apparatus 1304 may include means for training the positioning model by transmitting the set of positioning measurements to at least one of an OTT server, a network node, or the network entity for training the positioning model. The apparatus 1304 may include means for transmitting, for the network entity, a UE capability to provide the positioning information for a positioning model associated with a site of the UE. The UE capability may include at least one of (a) a timing gap condition/requirement between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, or (g) a set of zone information associated with the positioning model. The set of positioning information types may include at least one of (a) a ToA, (b) an RSTD, (c) an AoD, or (d) a second indication of an LOS identification. The maximum quantity may include at least one of (a) a first quantity of ToA values, (b) a second quantity of RSTD values, or (c) a third quality of LOS identification values. The set of zone information may include at least one of (a) a first range of latitudes associated with the positioning model, (b) a second range of longitudes associated with the positioning model, or (c) a third range of elevations associated with the positioning model. The set of RSs may include at least one of a set of PRSs or a set of CSI-RSs. The apparatus 1304 may include means for receiving a second set of RSs from each of a second plurality of network nodes. The second set of RSs may include a third subset of RSs from a third network node of the second plurality of network nodes and a fourth subset of RSs from a fourth network node of the second plurality of network nodes. The third subset of RSs and the fourth subset of RSs may be orthogonal relative to one another and may be received during a second same time period. The apparatus 1304 may include means for measuring the second set of RSs from each of the second plurality of network nodes received during the second same time period. The apparatus 1304 may include means for transmitting, for the network entity, positioning information associated with measuring the second set of RSs from each of the second plurality of network nodes. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
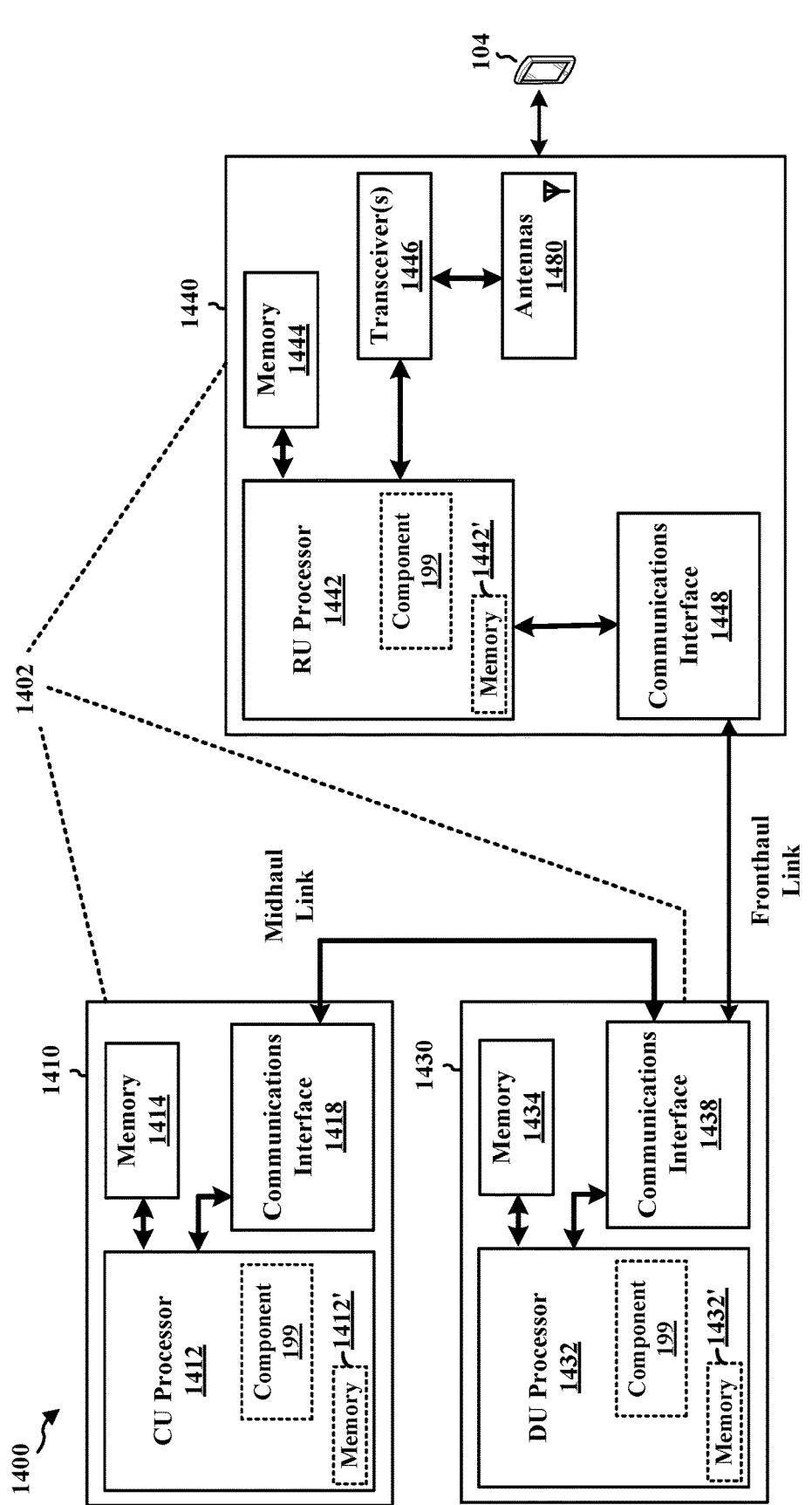
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to configure a plurality of network nodes to transmit a set of RSs at a UE. The component 199 may be configured to transmit assistance data for a positioning model at the UE. The component 199 may be configured to receive positioning information associated with a measurement of the set of RSs by the UE. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for configuring a plurality of network nodes to transmit a set of RSs at a UE. The network entity 1402 may include means for transmitting assistance data for a positioning model at the UE. The network entity 1402 may include means for receiving positioning information associated with a measurement of the set of RSs by the UE. The assistance data may include at least one of (a) a first indication of a set of reference TRP IDs associated with the plurality of network nodes, (b) a PRS configuration associated with a first subset of the set of RSs, (c) a second indication of an orthogonality associated with a second subset of the set of RSs, (d) a third indication of a correlation between a network node of the plurality of network nodes with a PRS resource, or (e) a reporting configuration. The reception of the positioning information may be based on the reporting configuration. The third indication may include a TRP ID associated with the network node and a PRS ID associated with the PRS resource. The reporting configuration may include at least one of (a) a fourth indication of a period between transmissions of the positioning information, (b) a fifth indication of an event that triggers the transmission of the positioning information, or (c) a sixth indication of a quantity of measurements associated with the positioning information. The network entity 1402 may include means for receiving an MO-LR message. The network entity 1402 may include means for transmitting a location response in response to the MO-LR message. The location response may include a set of predicted labels associated with the set of RSs. The set of predicted labels may include at least one of (a) a ToA, (b) an RSTD, (c) an AoD, (d) a first indication of an LOS identification, (e) a second indication of a set of PRS resources associated with the set of RSs or (f) a third indication of a set of TRPs associated with the plurality of network nodes. The location response may include a time stamp associated with each of the set of predicted labels. The network entity 1402 may include means for transmitting a training trigger message including at least one of an MT-LR message, or an NI-LR message. The training trigger message may include at least one of a first indicator of a first location associated with a network node of the plurality of network nodes and a second indicator of a beam angle associated with an RS of the set of RSs for training the positioning model. The network entity 1402 may include means for receiving a UE capability to provide the positioning information. The transmission of the assistance data may be in response to receiving the UE capability. The UE capability may include at least one of (a) a timing gap condition/requirement between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, or (g) a set of zone information associated with the positioning model. The set of positioning information types may include at least one of (a) a ToA, (b) an RSTD, (c) an AoD, or (d) a second indication of an LOS identification. The maximum quantity may include at least one of (a) a first quantity of ToA values, (b) a second quantity of RSTD values, or (c) a third quality of LOS identification values. The set of zone information may include at least one of (a) a first range of latitudes associated with the positioning model, (b) a second range of longitudes associated with the positioning model, or (c) a third range of elevations associated with the positioning model. The set of RSs may include at least one of a set of PRSs or a set of CSI-RSs. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
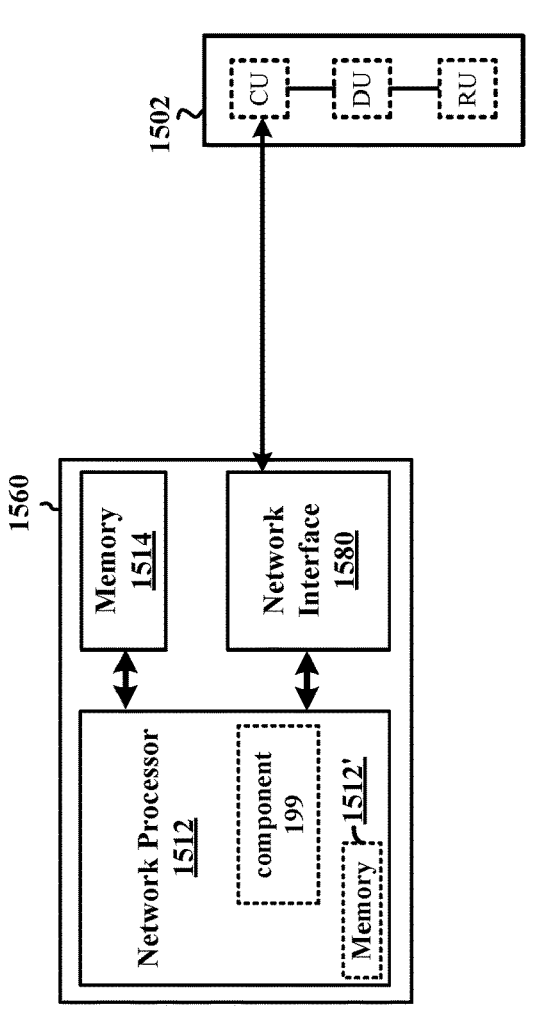
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The processor 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to configure a plurality of network nodes to transmit a set of RSs at a UE. The component 199 may be configured to transmit assistance data for a positioning model at the UE. The component 199 may be configured to receive positioning information associated with a measurement of the set of RSs by the UE. The component 199 may be within the processor 1512. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 may include means for configuring a plurality of network nodes to transmit a set of RSs at a UE. The network entity 1560 may include means for transmitting assistance data for a positioning model at the UE. The network entity 1560 may include means for receiving positioning information associated with a measurement of the set of RSs by the UE. The assistance data may include at least one of (a) a first indication of a set of reference TRP IDs associated with the plurality of network nodes, (b) a PRS configuration associated with a first subset of the set of RSs, (c) a second indication of an orthogonality associated with a second subset of the set of RSs, (d) a third indication of a correlation between a network node of the plurality of network nodes with a PRS resource, or (e) a reporting configuration. The reception of the positioning information may be based on the reporting configuration. The third indication may include a TRP ID associated with the network node and a PRS ID associated with the PRS resource. The reporting configuration may include at least one of (a) a fourth indication of a period between transmissions of the positioning information, (b) a fifth indication of an event that triggers the transmission of the positioning information, or (c) a sixth indication of a quantity of measurements associated with the positioning information. The network entity 1560 may include means for receiving an MO-LR message. The network entity 1560 may include means for transmitting a location response in response to the MO-LR message. The location response may include a set of predicted labels associated with the set of RSs. The set of predicted labels may include at least one of (a) a ToA, (b) an RSTD, (c) an AoD, (d) a first indication of an LOS identification, (e) a second indication of a set of PRS resources associated with the set of RSs or (f) a third indication of a set of TRPs associated with the plurality of network nodes. The location response may include a time stamp associated with each of the set of predicted labels. The network entity 1560 may include means for transmitting a training trigger message including at least one of an MT-LR message, or an NI-LR message. The training trigger message may include at least one of a first indicator of a first location associated with a network node of the plurality of network nodes and a second indicator of a beam angle associated with an RS of the set of RSs for training the positioning model. The network entity 1560 may include means for receiving a UE capability to provide the positioning information. The transmission of the assistance data may be in response to receiving the UE capability. The UE capability may include at least one of (a) a timing gap condition/requirement between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, or (g) a set of zone information associated with the positioning model. The set of positioning information types may include at least one of (a) a ToA, (b) an RSTD, (c) an AoD, or (d) a second indication of an LOS identification. The maximum quantity may include at least one of (a) a first quantity of ToA values, (b) a second quantity of RSTD values, or (c) a third quality of LOS identification values. The set of zone information may include at least one of (a) a first range of latitudes associated with the positioning model, (b) a second range of longitudes associated with the positioning model, or (c) a third range of elevations associated with the positioning model. The set of RSs may include at least one of a set of PRSs or a set of CSI-RSs. The means may be the component 199 of the network entity 1560 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets and subsets should be interpreted as a set of elements where the elements number one or more. Accordingly, for a set of X, X would include one or more elements. If a first apparatus receives data from or transmits data to a second apparatus, the data may be received/ transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising receiving a set of reference signals (RSs) from each of a plurality of network nodes, wherein the set of RSs comprises a first subset of RSs from a first network node of the plurality of network nodes and a second subset of RSs from a second network node of the plurality of network nodes, wherein the first subset of RSs and the second subset of RSs are non. The method comprises measuring the set of RSs from each of the plurality of network nodes received during the same time period. The method comprises transmitting, for a network entity, positioning information associated with measuring the set of RSs from each of the plurality of network nodes.

Aspect 2 is the method of aspect 1, wherein the method comprises calculating the positioning information using a positioning model based on the measured set of RSs from each of the plurality of network nodes.

Aspect 3 is the method of aspect 2, wherein measuring the set of RSs from each of the plurality of network nodes comprises measuring at least one RS for each of the plurality of network nodes.

Aspect 4 is the method of either of aspects 2 or 3, wherein measuring the set of RSs from each of the plurality of network nodes comprises constructing a composite measurement of a third subset of the set of RSs for each of the plurality of network nodes.

Aspect 5 is the method of any of aspects 2 to 4, wherein the network entity comprises a location management function (LMF), wherein the method comprises receiving assistance data from the LMF, wherein calculating the positioning information using the positioning model is based on the assistance data.

Aspect 6 is the method of aspect 5, wherein the assistance data comprises at least one of (a) a first indication of a set of reference TRP identifiers (IDs) associated with the plurality of network nodes, (b) a positioning reference signal (PRS) configuration associated with a third subset of the set of RSs, (c) a second indication of an orthogonality associated with a fourth subset of the set of RSs, (d) a third indication of a correlation between a network node of the plurality of network nodes with a PRS resource, (e) a fourth indication of a set of reference PRS IDs associated with the set of RSs, or (f) a reporting configuration, wherein transmitting the positioning information comprises transmitting the positioning information based on the reporting configuration.

Aspect 7 is the method of aspect 6, wherein the third indication comprises a TRP ID associated with the network node and a PRS ID associated with the PRS resource.

Aspect 8 is the method of either of aspects 6 or 7, wherein the reporting configuration comprises at least one of (a) a fourth indication of a period between transmissions of the positioning information, (b) a fifth indication of an event that triggers the transmission of the positioning information, or (c) a sixth indication of a quantity of measurements associated with the positioning information.

Aspect 9 is the method of any of aspects 6 to 8, wherein the assistance data comprises at least one of: (1) a fifth indication of a second set of reference TRP IDs, wherein the second set of reference TRP IDs comprises the set of reference TRP IDs, wherein the second set of reference TRP IDs is larger than the set of reference TRP IDs, wherein the positioning information comprises a seventh indication of the set of reference TRP IDs, or (2) the assistance data comprises a sixth indication of a second set of reference PRS IDs, wherein the second set of reference PRS IDs comprises the set of reference PRS IDs, wherein the second set of reference PRS IDs is larger than the set of reference TRP IDs, wherein the positioning information comprises an eighth indication of the set of reference PRS IDs.

Aspect 10 is the method of any of aspects 1 to 9, wherein the method comprises training a positioning model based on a set of predicted labels associated with the positioning information and the measured set of RSs from each of the plurality of network nodes.

Aspect 11 is the method of aspect 10, wherein the method comprises transmitting a mobile originated location request (MO-LR) message. The method comprises receiving a location response based on the MO-LR message, wherein the location response comprises a third subset of the set of predicted labels.

Aspect 12 is the method of aspect 11, wherein the third subset of the set of predicted labels comprises at least one of (a) a time of arrival (ToA), (b) a reference signal time difference (RSTD), (c) an angle of departure (AoD), (d) a first indication of a line-of-sight (LOS) identification, (e) a second indication of a set of positioning reference signal (PRS) resources associated with the set of RSs or (f) a third indication of a set of transmission reception points (TRPs) associated with the plurality of network nodes.

Aspect 13 is the method of either of aspects 11 or 12, wherein the location response comprises a time stamp associated with each of the third subset of the set of predicted labels.

Aspect 14 is the method of aspect 10, wherein the method may include receiving a training trigger message including at least one of a mobile terminated location request (MT-LR) message, or a network induced location request (NI-LR) message, wherein training the positioning model based on the set of predicted labels comprises training the positioning model in response to receiving the training trigger message.

Aspect 15 is the method of aspect 14, wherein the training trigger message comprises at least one of a first indicator of a first location associated with a network node of the plurality of network nodes and a second indicator of a beam angle associated with an RS of the set of RSs. The method comprises calculating a second location of the UE based on at least one of the first indicator or the second indicator, wherein the set of predicted labels comprises the calculated second location.

Aspect 16 is the method of aspect 10, wherein training the positioning model comprises transmitting a set of positioning measurements based on the measured set of RSs to at least one of an over-the-top (OTT) server, a network node, or the network entity for training the positioning model.

Aspect 17 is the method of any of aspects 1 to 16, wherein the method comprises transmitting, for the network entity, a UE capability to provide the positioning information for a positioning model associated with a site of the UE.

Aspect 18 is the method of aspect 17, wherein the UE capability comprises at least one of (a) a timing gap condition between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, or (g) a set of zone information associated with the positioning model.

Aspect 19 is the method of aspect 18, wherein the set of positioning information types comprises at least one of (a) a time of arrival (ToA), (b) a reference signal time difference (RSTD), (c) an angle of departure (AoD), or (d) a second indication of a line-of-sight (LOS) identification.

Aspect 20 is the method of either of aspects 18 or 19, wherein the maximum quantity comprises at least one of (a) a first quantity of ToA values, (b) a second quantity of RSTD values, or (c) a third quantity of LOS identification values.

Aspect 21 is the method of any of aspects 18 to 20, wherein the set of zone information comprises at least one of (a) a first range of latitudes associated with the positioning model, (b) a second range of longitudes associated with the positioning model, or (c) a third range of elevations associated with the positioning model.

Aspect 22 is the method of any of aspects 1 to 21, wherein the set of RSs comprises at least one of a set of positioning reference signals (PRSs) or a set of channel state information (CSI) reference signals (CSI-RSs).

Aspect 23 is the method of any of aspects 1 to 22, wherein the method comprises receiving a second set of RSs from each of a second plurality of network nodes, wherein the second set of RSs comprises a third subset of RSs from a third network node of the second plurality of network nodes and a fourth subset of RSs from a fourth network node of the second plurality of network nodes, wherein the third subset of RSs and the fourth subset of RSs are orthogonal relative to one another and are received during a second same time period. The method comprises measuring the second set of RSs from each of the second plurality of network nodes received during the second same time period. The method comprises transmitting, for the network entity, a second positioning information associated with measuring the second set of RSs from each of the second plurality of network nodes.

Aspect 24 is a method of wireless communication at a network entity, wherein the method comprises configuring a plurality of network nodes to transmit a set of reference signals (RSs) at a user equipment (UE). The method comprises transmitting assistance data for a positioning model at the UE. The method comprises receiving positioning information associated with a measurement of the set of RSs by the UE.

Aspect 25 is the method of aspect 24, wherein the assistance data may include at least one of (a) a first indication of a set of reference transmission reception point (TRP) identifiers (IDs) associated with the plurality of network nodes, (b) a positioning reference signal (PRS) configuration associated with a first subset of the set of RSs, (c) a second indication of an orthogonality associated with a second subset of the set of RSs, (d) a third indication of a correlation between a network node of the plurality of network nodes with a PRS resource, (e), a fourth indication of a set of reference PRS IDs associated with the set of RSs, or (f) a reporting configuration, wherein the reception of the positioning information is based on the reporting configuration.

Aspect 26 is the method of aspect 25, wherein the third indication comprises a TRP ID associated with the network node and a PRS ID associated with the PRS resource.

Aspect 27 is the method of any of aspects 24 to 26, wherein the reporting configuration comprises at least one of (a) a fourth indication of a period between transmissions of the positioning information, (b) a fifth indication of an event that triggers the transmission of the positioning information, or (c) a sixth indication of a quantity of measurements associated with the positioning information.

Aspect 28 is the method of any of aspects 24 to 27, wherein the method comprises receiving a mobile originated location request (MO-LR) message. The method comprises transmitting a location response in response to the MO-LR message, wherein the location response comprises a set of predicted labels associated with the set of RSs.

Aspect 29 is the method of aspect 28, wherein the set of predicted labels comprises at least one of (a) a time of arrival (ToA), (b) a reference signal time difference (RSTD), (c) an

51 angle of departure (AoD), (d) a first indication of an line-of-sight (LOS) identification, (e) a second indication of a set of PRS resources associated with the set of RSs or (f) a third indication of a set of TRPs associated with the plurality of network nodes.

Aspect 30 is the method of either of aspects 28 or 29, wherein the location response comprises a time stamp associated with each of the set of predicted labels.

Aspect 31 is the method of any of aspects 24 to 30, wherein the method comprises transmitting a training trigger message including at least one of a mobile terminated location request (MT-LR) message, or a network induced location request (NI-LR) message, wherein the training trigger message comprises at least one of a first indicator of a first location associated with a network node of the plurality of network nodes and a second indicator of a beam angle associated with an RS of the set of RSs for training the positioning model.

Aspect 32 is the method of any of aspects 24 to 31, wherein the method comprises receiving a UE capability to provide the positioning information, wherein the transmission of the assistance data is in response to receiving the UE capability.

Aspect 33 is the method of aspect 32, wherein the UE capability comprises at least one of (a) a timing gap condition between each of the set of RSs, (b) a maximum number of network nodes for the plurality of network nodes, (c) a BW range associated with the set of RSs, (d) an indication of a set of RS resources associated with the set of RSs, (e) a set of positioning information types associated with the positioning information, (f) a maximum quantity associated with each positioning information type of the set of positioning information types, or (g) a set of zone information associated with the positioning model.

Aspect 34 is the method of aspect 33, wherein the set of positioning information types comprises at least one of (a) a time of arrival (ToA), (b) a reference signal time difference (RSTD), (c) an angle of departure (AoD), or (d) a second indication of a line-of-sight (LOS) identification.

Aspect 35 is the method of either of aspects 33 or 34, wherein the maximum quantity comprises at least one of (a) a first quantity of time of arrival (ToA) values, (b) a second quantity of reference signal time difference (RSTD) values, or (c) a third quality of line-of-sight (LOS) identification values.

Aspect 36 is the method of any of aspects 33 to 35, wherein the set of zone information comprises at least one of (a) a first range of latitudes associated with the positioning model, (b) a second range of longitudes associated with the positioning model, or (c) a third range of elevations associated with the positioning model.

Aspect 37 is the method of any of aspects 24 to 36, where the set of RSs may include at least one of a set of positioning reference signals (PRSs) or a set of channel state information (CSI) reference signals (CSI-RSs).

Aspect 38 is an apparatus for wireless communication, including: a memory; and at least one processor coupled to the memory and, based at least in part on information stored in the memory, the at least one processor is configured to implement any of aspects 1 to 37.

Aspect 39 is the apparatus of aspect 38, further including at least one of an antenna or a transceiver coupled to the at least one processor.

Aspect 40 is an apparatus for wireless communication including means for implementing any of aspects 1 to 37.

Aspect 41 is a computer-readable medium (e.g., a non-transitory computer-readable medium) storing computer

52 executable code, where the code when executed by a processor causes the processor to implement any of aspects 1 to 37.

What is claimed is:

1. An apparatus for wireless communication at a user equipment (UE), comprising:
memory; and
at least one processor coupled to the memory and, based at least in part on information stored in the memory, the at least one processor is configured to:
receive a set of reference signals (RSs) from each of a plurality of transmission reception points (TRPs), wherein the set of RSs comprises a first subset of RSs from a first set of TRPs of the plurality of TRPs and a second subset of RSs from a second set of TRPs of the plurality of TRPs, wherein the first subset of RSs and the second subset of RSs are non-orthogonal relative to one another and are received simultaneously during a same time period;
measure the first subset of RSs and the second subset of RSs; and
transmit, for a network entity, positioning information associated with the measured first subset of RSs and the second subset of RSs.

2. The apparatus of claim 1, wherein the at least one processor is further configured to:
calculate the positioning information using a positioning model based on the measured first subset of RSs and the second subset of RSs.

3. The apparatus of claim 2, wherein, to measure the first subset of RSs and the second subset of RSs, the at least one processor is configured to:
measure at least one RS from each TRP of the first set of TRPs and from each TRP of the second set of TRPs.

4. The apparatus of claim 2, wherein, to measure the first subset of RSs and the second subset of RSs, the at least one processor is configured to:
construct a composite measurement of the first subset of RSs and the second subset of RSs.

5. The apparatus of claim 2, wherein the network entity comprises a location management function (LMF), wherein the at least one processor is further configured to:
receive assistance data from the LMF, wherein, to calculate the positioning information using the positioning model, the at least one processor is configured to:
calculate the positioning information using the positioning model further based on the assistance data.

6. The apparatus of claim 5, wherein the assistance data comprises at least one of:
a first indication of a set of reference TRP identifiers (IDs) associated with the plurality of TRPs;
a positioning reference signal (PRS) configuration associated with a third subset of the set of RSs;
a second indication of an orthogonality associated with a fourth subset of the set of RSs;
a third indication of a correlation between a TRP of the plurality of TRPs with a PRS resource;
a fourth indication of a set of reference PRS IDs associated with the set of RSs; or
a reporting configuration, wherein, to transmit the positioning information, the at least one processor is configured to transmit the positioning information based on the reporting configuration.

7. The apparatus of claim 6, wherein the third indication comprises a TRP ID associated with the TRP and a PRS ID associated with the PRS resource.

8. The apparatus of claim 6, wherein the reporting configuration comprises at least one of:

a fifth indication of a period between transmissions of the positioning information;

a sixth indication of an event that triggers the transmission of the positioning information; or a seventh indication of a quantity of measurements associated with the positioning information.

9. The apparatus of claim 6, wherein the positioning information comprises at least one of:

a fifth indication of a second set of reference TRP IDs, wherein the second set of reference TRP IDs is associated with the first set of TRPs and the second set of TRPs, wherein the second set of reference TRP IDs is smaller than the set of reference TRP IDs; or a sixth indication of a second set of reference PRS IDs, wherein the second set of reference PRS IDs is associated with the first subset of RSs and the second subset of RSs, wherein the second set of reference PRS IDs is smaller than the set of reference PRS IDs.

10. The apparatus of claim 1, wherein the at least one processor is further configured to:

train a positioning model based on a set of predicted labels associated with the positioning information and the measured set of RSs from each of the plurality of TRPs.

11. The apparatus of claim 10, wherein the at least one processor is further configured to:

transmit a mobile originated location request (MO-LR) message; and receive a location response based on the MO-LR message, wherein the location response comprises a third subset of the set of predicted labels.

12. The apparatus of claim 11, wherein the third subset of the set of predicted labels comprises at least one of:

a time of arrival (ToA);

a reference signal time difference (RSTD);

an angle of departure (AoD);

a first indication of a line-of-sight (LOS) identification;

a second indication of a set of positioning reference signal (PRS) resources associated with the set of RSs; or a third indication of a set of transmission reception points (TRPs) associated with the plurality of TRPs.

13. The apparatus of claim 11, wherein the location response comprises a time stamp associated with each of the third subset of the set of predicted labels.

14. The apparatus of claim 10, wherein the at least one processor is further configured to:

receive a training trigger message comprising at least one of a mobile terminated location request (MT-LR) message, or a network induced location request (NI-LR) message, wherein, to train the positioning model based on the set of predicted labels, the at least one processor is configured to train the positioning model in response to receiving the training trigger message.

15. The apparatus of claim 14, wherein the training trigger message comprises at least one of a first indicator of a first location associated with a TRP of the plurality of TRPs and a second indicator of a beam angle associated with an RS of the set of RSs, wherein the at least one processor is further configured to:

calculate a second location of the UE based on at least one of the first indicator or the second indicator, wherein the set of predicted labels comprises the calculated second location.

16. The apparatus of claim 10 further comprising a transceiver coupled to the at least one processor, wherein, to train the positioning model, the at least one processor is configured to:

transmit, via the transceiver, a set of positioning measurements based on the measured set of RSs to at least one of an over-the-top (OTT) server, a TRP, or the network entity to train the positioning model, wherein each of the plurality of TRPs comprises a corresponding set of transceivers configured to transmit a corresponding subset of the set of RSs.

17. The apparatus of claim 1, wherein the at least one processor is further configured to:

transmit, for the network entity, a UE capability to provide the positioning information for a positioning model associated with a site of the UE, wherein the UE capability comprises an indication of whether the UE is capable of measuring non-orthogonal resources, or both orthogonal and non-orthogonal resources.

18. The apparatus of claim 17, wherein the UE capability comprises at least one of:

a timing gap condition between each of the set of RSs;

a maximum number of TRPs for the plurality of TRPs;

a BW range associated with the set of RSs;

an indication of a set of RS resources associated with the set of RSs;

a set of positioning information types associated with the positioning information;

a maximum quantity associated with each positioning information type of the set of positioning information types; or a set of zone information associated with the positioning model.

19. The apparatus of claim 18, wherein the set of positioning information types comprises at least one of:

a time of arrival (ToA);

a reference signal time difference (RSTD);

an angle of departure (AoD); or a second indication of a line-of-sight (LOS) identification.

20. The apparatus of claim 18, wherein the maximum quantity comprises at least one of:

a first quantity of ToA values;

a second quantity of RSTD values; or a third quantity of LOS identification values.

21. The apparatus of claim 18, wherein the set of zone information comprises at least one of:

a first range of latitudes associated with the positioning model;

a second range of longitudes associated with the positioning model; or a third range of elevations associated with the positioning model.

22. The apparatus of claim 1, wherein the set of RSs comprise at least one of a set of positioning reference signals (PRSs) or a set of channel state information (CSI) reference signals (CSI-RSs).

23. The apparatus of claim 1, wherein the at least one processor is further configured to:

receive a second set of RSs from each of a second plurality of TRPs, wherein the second set of RSs comprises a third subset of RSs from a third TRP of the second plurality of TRPs and a fourth subset of RSs from a fourth TRP of the second plurality of TRPs, wherein the third subset of RSs and the fourth subset of RSs are orthogonal relative to one another and are received during a second same time period;

measure the second set of RSs from each of the second plurality of TRPs received during the second same time period; and transmit, for the network entity, a second positioning information associated with measuring the second set of RSs from each of the second plurality of TRPs.

24. An apparatus for wireless communication at a network entity, comprising:

memory; and at least one processor coupled to the memory and, based at least in part on information stored in the memory, the at least one processor is configured to:

configure a plurality of transmission reception points (TRPs) to transmit a set of reference signals (RSs) at a user equipment (UE);

transmit assistance data for a positioning model at the UE, wherein the assistance data comprises an indication of non-orthogonality between a first subset of RSs from a first set of TRPs of the plurality of TRPs and a second subset of RSs from a second set of TRPs of the plurality of TRPs, wherein the first subset of RSs and the second subset of RSs are transmitted simultaneously during a same time period; and receive positioning information associated with a measurement of the first subset of RSs and the second subset of RSs by the UE.

25. The apparatus of claim 24, wherein the assistance data comprises at least one of:

a first indication of a set of reference transmission reception point (TRP) identifiers (IDs) associated with the plurality of TRPs;

a positioning reference signal (PRS) configuration associated with a first subset of the set of RSs;

a second indication of an orthogonality associated with a second subset of the set of RSs;

a third indication of a correlation between a TRP of the plurality of TRPs with a PRS resource;

a fourth indication of a set of reference PRS IDs associated with the set of RSs; or a reporting configuration, wherein the reception of the positioning information is based on the reporting configuration.

26. The apparatus of claim 25, wherein the third indication comprises a TRP ID associated with the TRP and a PRS ID associated with the PRS resource.

27. The apparatus of claim 25, wherein the reporting configuration comprises at least one of:

a fifth indication of a period between reception of the positioning information;

a sixth indication of an event that triggers the reception of the positioning information; or a seventh indication of a quantity of measurements associated with the positioning information.

28. The apparatus of claim 24, further comprising a transceiver coupled to the at least one processor, wherein the at least one processor is further configured to:

receive, via the transceiver, a mobile originated location request (MO-LR) message; and transmit, via the transceiver, a location response in response to the MO-LR message, wherein the location response comprises a set of predicted labels associated with the set of RSs, wherein each of the plurality of TRPs comprises a corresponding set of transceivers configured to transmit a corresponding subset of the set of RSs.

29. A method of wireless communication at a user equipment (UE), comprising:

receiving a set of reference signals (RSs) from each of a plurality of transmission reception points (TRPs), wherein the set of RSs comprises a first subset of RSs from a first set of TRPs of the plurality of TRPs and a second subset of RSs from a second set of TRPs of the plurality of TRPs, wherein the first subset of RSs and the second subset of RSs are non-orthogonal relative to one another and are received simultaneously during a same time period;

measuring the first subset of RSs and the second subset of RSs; and transmitting, for a network entity, positioning information associated with the measured first subset of RSs and the second subset of RSs.

30. A method of wireless communication at a network entity, comprising:

configuring a plurality of TRPs to transmit a set of reference signals (RSS) at a user equipment (UE);

transmitting assistance data for a positioning model at the UE, wherein the assistance data comprises an indication of non-orthogonality between a first subset of RSs from a first set of TRPs of the plurality of TRPs and a second subset of RSs from a second set of TRPs of the plurality of TRPs, wherein the first subset of RSs and the second subset of RSs are transmitted simultaneously during a same time period; and receiving positioning information associated with a measurement of the first subset of RSs and the second subset of RSs by the UE.

* * * * *